United States Patent [19]

Ulug

[11] Patent Number: 4,464,749
[45] Date of Patent: Aug. 7, 1984

[54] BI-DIRECTIONAL TOKEN FLOW SYSTEM
[75] Inventor: Mehmet E. Ulug, Schenectady, N.Y.
[73] Assignee: General Electric Company, Schenectady, N.Y.
[21] Appl. No.: 351,821
[22] Filed: Feb. 24, 1982
[51] Int. Cl.³ .............................................. H04J 6/00
[52] U.S. Cl. ........................................ 370/85; 370/94
[58] Field of Search ...................... 370/85, 95, 90, 96, 370/86, 89, 94, 92; 340/825.5

[56] References Cited

U.S. PATENT DOCUMENTS

| | | | |
|---|---|---|---|
| 3,593,290 | 7/1971 | Kerr | 370/90 |
| 3,597,549 | 8/1971 | Farmer | 370/90 |
| 3,796,992 | 3/1974 | Nakamura et al. | 370/85 |
| 3,851,104 | 11/1974 | Willard et al. | 179/15 |
| 4,063,220 | 12/1977 | Metcalfe et al. | 340/147 |
| 4,210,780 | 7/1980 | Hopkins et al. | 370/80 |
| 4,229,792 | 10/1980 | Jensen et al. | 370/85 |
| 4,293,948 | 10/1981 | Soderblom | 370/90 |
| 4,387,425 | 6/1983 | El-Gohary | 370/85 |

OTHER PUBLICATIONS

"Bidirectional Token Flow System", by Ulug et al., Proceedings Seventh Data Communications Symposium, Mexico City, Mexico, Oct. 27-29, 1981.
Fouad A. Tobagi, "Multiaccess Protocols in Packet Communication Systems," IEEE Transactions on Communications, vol. Com-28, No. 4, Apr. 1980, pp. 468-488.

Primary Examiner—Douglas W. Olms
Attorney, Agent, or Firm—Bernard J. Lacomis; James C. Davis, Jr.

[57] ABSTRACT

A bus accessing system for permitting a plurality of bus information units (BIUs) to sequentially gain access to an information bus utilizes a bidirectional token flow process in which the right to transmit a packet of information on the bus is transmitted from BIU to BIU by the passing of a virtual token. No two BIUs receive a token at the same time, whereby only one BIU will have the right to place its information packet on the bus at any given instant. Each BIU calculates a token time interval, unique to each respective BIU, beginning at receipt of a start-up packet, as a function of its logical position on the bus.

34 Claims, 16 Drawing Figures

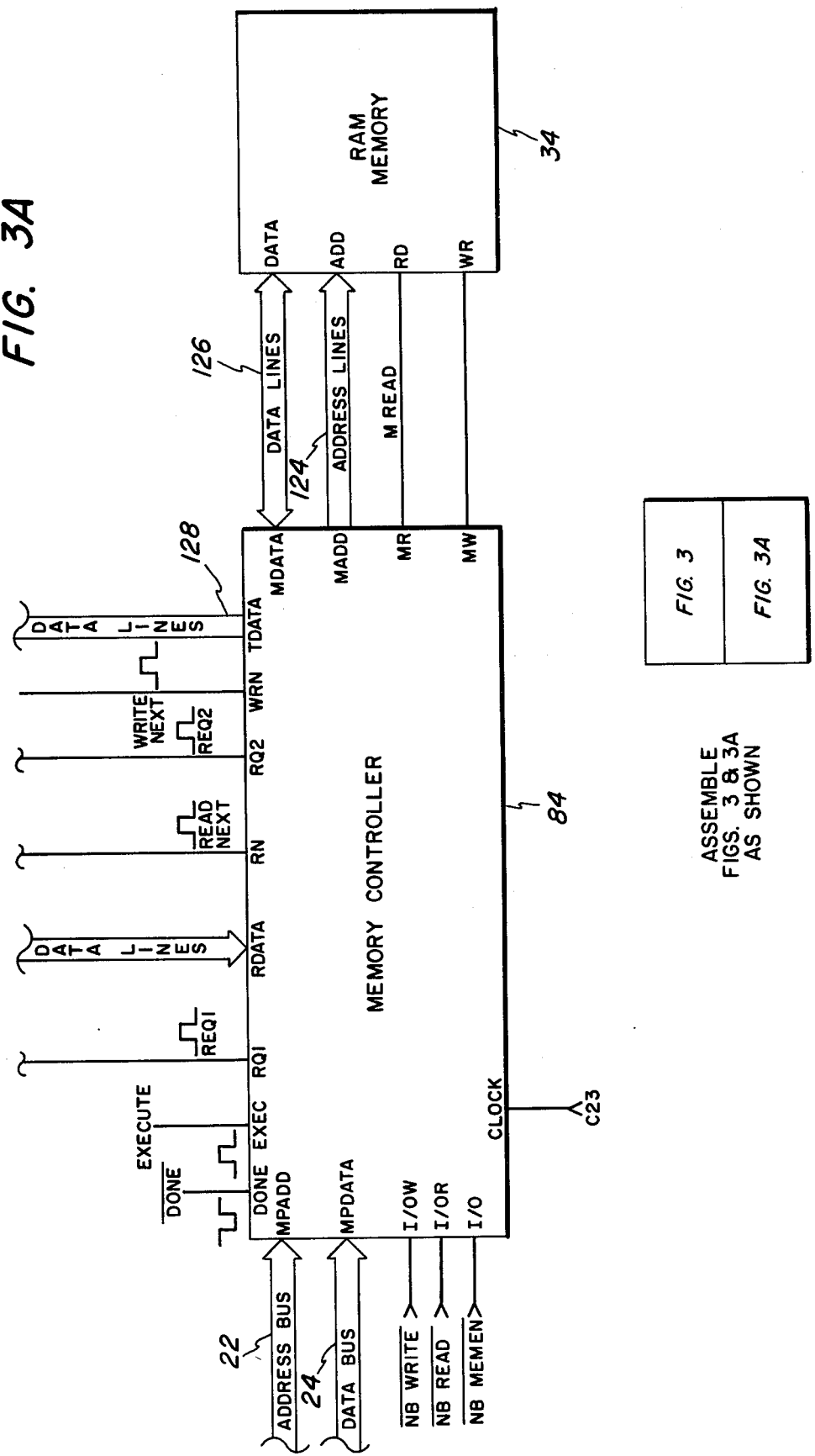

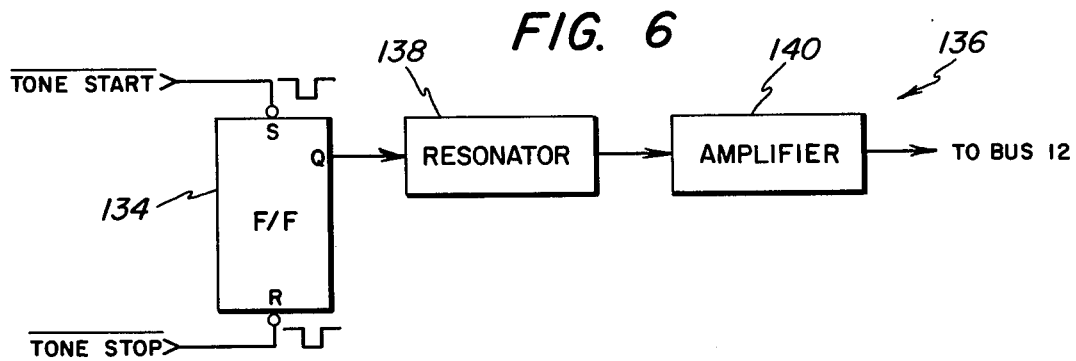

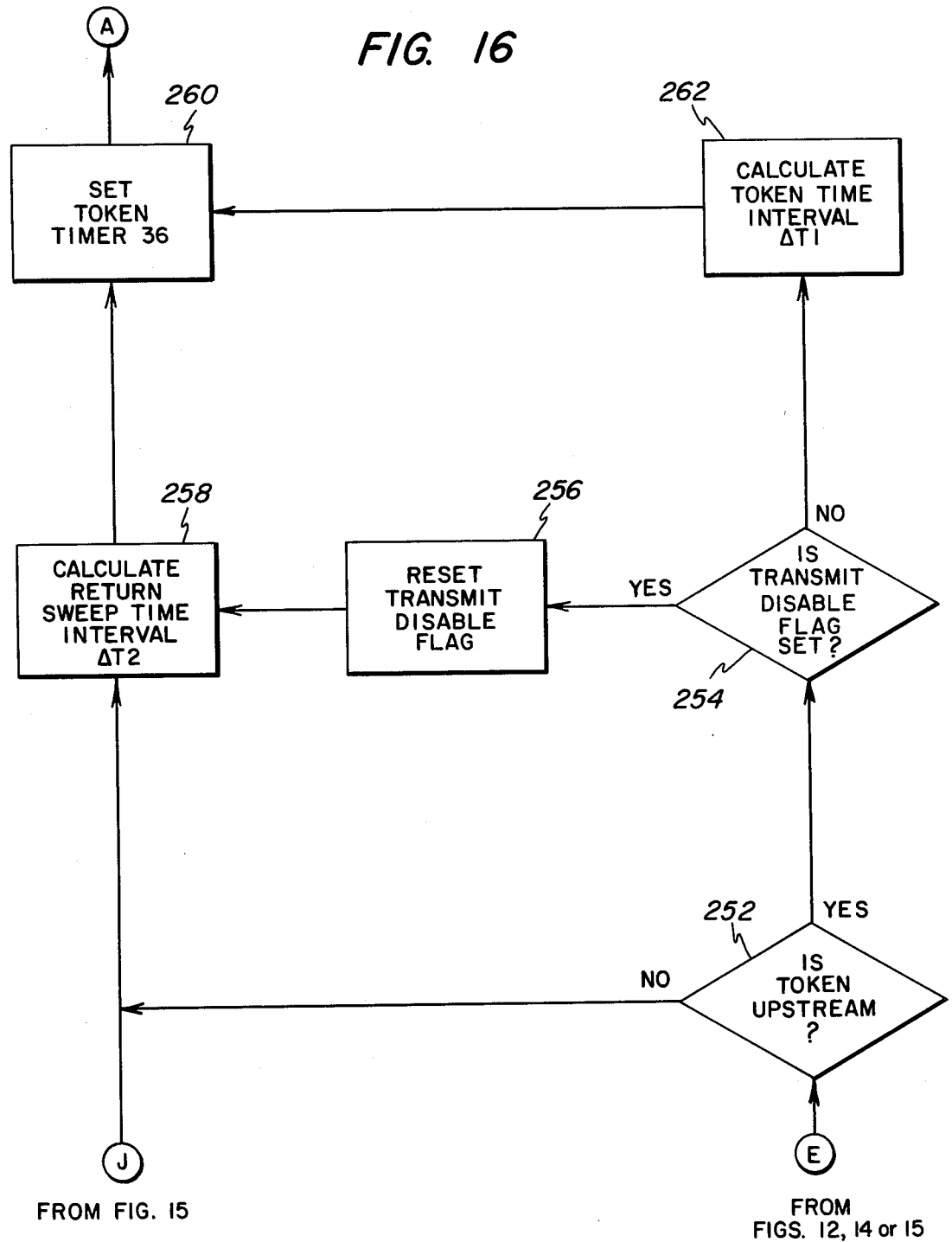

BI-DIRECTIONAL TOKEN FLOW SYSTEM

BACKGROUND OF THE INVENTION

The present invention is directed towards a bus accessing system in which a plurality of user terminals communicate with each other via a plurality of bus interface units (BIUs) which are connected to a common transmission bus.

In known bus communication systems, each of a plurality of BIUs is associated with at least one user terminal and periodically places information from its associated user terminal on the transmission bus for transmission to the remaining BIUs. The BIU formats the user information into one or more information packets, which generally include: a source address (the address of the BIU associated with the user terminal); a destination address (the address of the user terminal for which the information is intended and its associated BIU); the information to be transmitted; and various other information, such as parity or CRC bits, etc. Once the BIU has properly formatted the information, the BIU places the information packet on the bus for transmission to the remaining BIUs, at times determined by the particular bus accessing method being used. One such bus accessing method is known as a time-division multiple access (TDMA) system, wherein each user terminal is assigned a specific time slot during which it can gain access to the transmission bus. Exemplary of such systems is U.S. Pat. No. 3,851,104. Another major access method is a contention system which uses a listen-while-talk protocol. In this system, the BIU continually monitors the condition of the transmission bus and places information packets on the bus whenever the bus is silent. If, during a transmission, the BIU detects other information on the bus, it halts its transmission for a variable time period and then attempts to regain access to the bus when the line is silent. Examplary of such systems are U.S. Pat. Nos. 4,210,780 and 4,063,220.

Once the formatted packet is placed on bus, it is examined by each of the remaining BIUs to determine if the information contained in the packet is for one or more of the user terminals associated with that BIU. If the packet is for one of its associated user terminals, the BIU reformats the received packet into a form which can be accepted by its user terminal and applies the information to the user terminal at time intervals consistent with the needs of the specific user terminal.

BRIEF DESCRIPTION OF THE INVENTION

The bus accessing system of the present invention utilizes a bi-directional token flow process in which the right to transmit a packet of information on the transmission bus is transferred from BIU to BIU by the passing of a virtual token. No two BIUs receive a token at the same time; only one BIU will have the right to place its information packet on the bus at any given instant. This process avoids the collision of data on the bus and provides a fast and efficient method of transmitting data between the various user terminals. This method is significantly faster than the time division multiple access system of the prior art during periods of light but usage, since there are no unused time slots. It is more efficient than the contention system of the prior art during periods of high bus usage, since it avoids both the loss of information on the bus due to packet collisions and the loss of time due to the use of various back-off algorithms.

BRIEF DESCRIPTION OF THE DRAWINGS

For the purpose of illustrating the invention, there is shown in the drawings an embodiment which is presently preferred, it being understood, however, that the invention is not limited to the precise arrangements and instrumentalities shown.

FIGS. 2-8 are block diagrams illustrating various components of the bus interface units of FIG. 1; and FIGS. 9-16 are flow diagrams illustrating the computer program carried out by the microprocessor of FIG. 2.

DETAILED DESCRIPTION OF THE INVENTION

Figure 1:
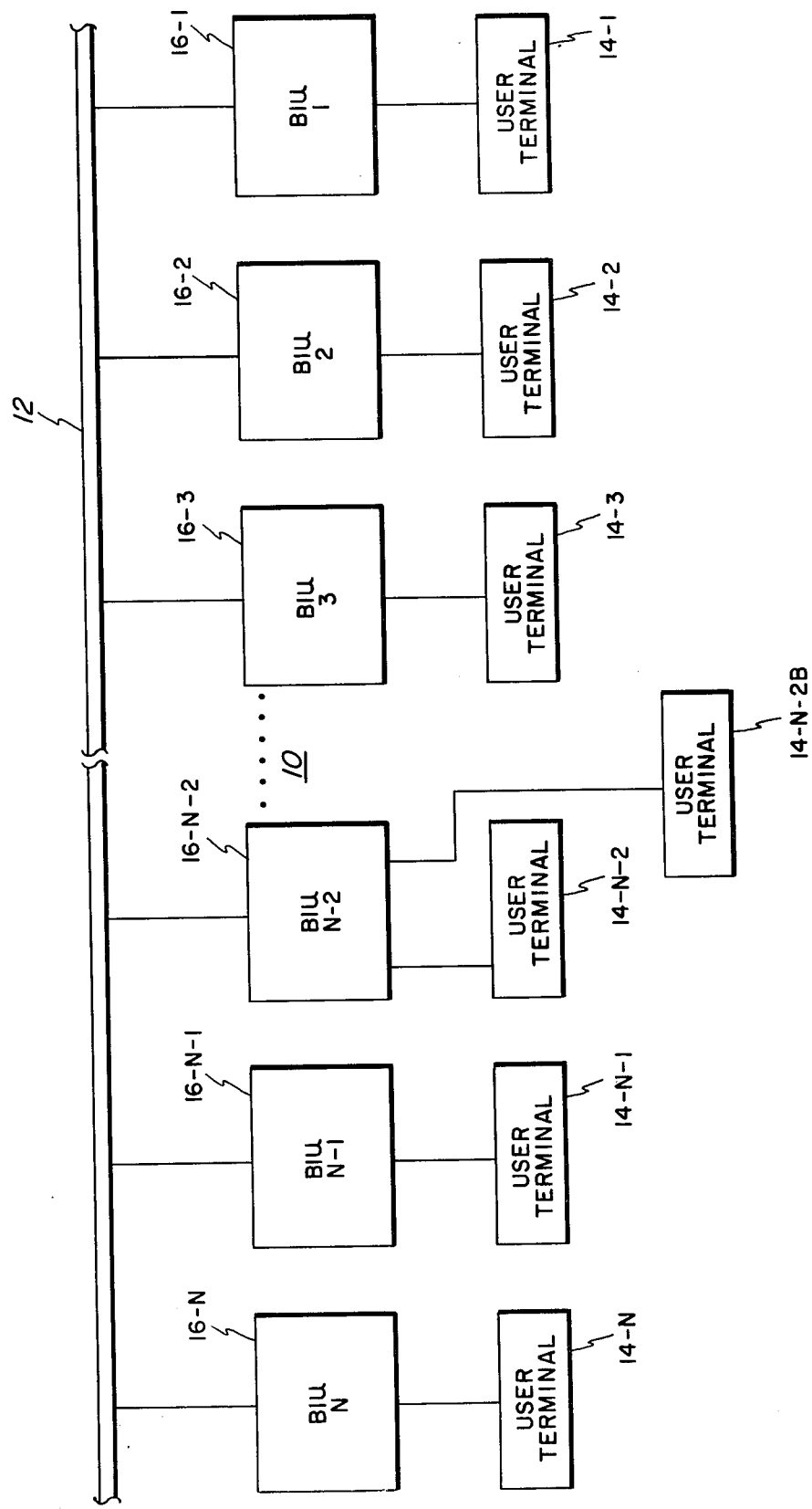
FIG. 1 is a block diagram illustrating a bus communication system in which the bus accessing scheme of the present invention may be used.
Figure 2:
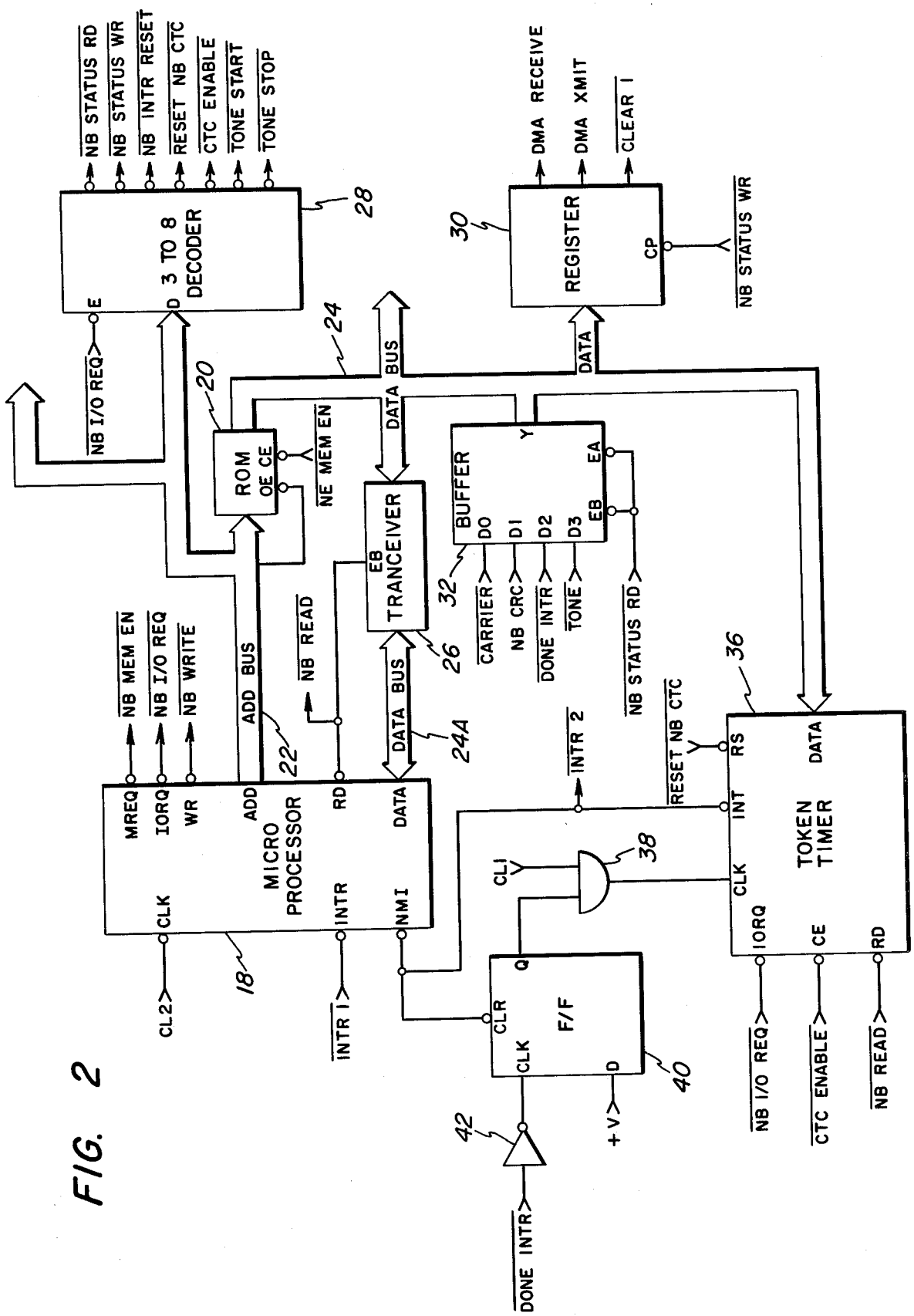

Referring now to the drawings, wherein like numerals indicate like elements, there is shown in FIG. 1 a bus communication system 10 in which the bus accessing system of the present invention may be used. Bus communication system 10 includes a transmission line 12 which is connected as a serial straight-line topology bus to a plurality of user terminals 14 via a plurality N of bus interface units (BIUs) 16. If necessary, the bus may be folded upon itself to provide a ring, star or branching-tree bus topology. The purpose of the bus communication system 10 is to permit each of the user terminals to transmit data (in the form of information packets) to the remaining user terminals via the transmission line 12.

The user terminals 14 may be computers, terminals or other devices capable of generating and/or accepting digital information. The transmission bus 12 may take the form of any suitable transmission system such as a CATV, coaxial or fiber optic cable, and the like. In the system illustrated in FIG. 1, it is assumed that transmission bus 12 is a bi-directional bus. Fiber optic cables are uni-directional and therefore require two transmission buses, one for each direction. Such a system is illustrated in U.S. Pat. No. 4,210,780 and may be used in connection with the present invention.

The manner in which user terminal information is transmitted between the user terminals 14 and their respective BIUs 16, and the method for properly formatting the information packets as they are transferred between the user terminals 14 and the BIUs 16, are well known in the art and do not form part of the present invention. Accordingly, the specific methods and apparatus for carrying out these transfers will not be described herein. Exemplary methods for achieving these results may be found in U.S. Pat. Nos. 4,063,220 and 4,210,780. The present invention concerns the bus accessing method under which the information packets, once properly formatted either according to a packet-switching or a circuit-switching mode of operation, are transferred from the BIUs 16 to the transmission bus 12 and the manner in which the packets on transmission bus 12 are transferred to the individual BIUs 16, for later transfer to the user terminals 14. Accordingly, it will be assumed that information is periodically transferred from a user terminal 14 to its associated BIU 16 and is formatted for transmission by the BIU.

The bus accessing method of the present invention utilizes a bi-directional token flow system in which the right to transmit a packet of information on transmission bus 12 is transferred from BIU to BIU by the passing of a virtual token. No two BIUs will receive the token at the same time. As such, only one BIU will have the right to place its informaion packet on the bus 12 at any given instant. This process avoids the collision of data on bus 12 and provides a fast and efficient method of transmitting data between the various user terminals 14. This method is significantly faster than the time division multiple access system of the prior art and is more efficient than the contention system of the prior art, since it avoids the loss of information on the bus due to packet collisions.

Token passing is initiated by the generation of a start-up packet by one of the two end BIUs 16-1 or 16-N. These BIUs are referred to as token generators since they initiate the token passing sweeps. For purposes of explanation, it will be assumed that BIU 16-1 initiates the first sweep by generating a start-up packet (which may also be a normal packet addressed to a particular BIU). Since this sweep is initiated by the rightmost BIU, it will be referred to as a right sweep. The start-up packet may take the following form:

FS|DA|SA|SD|PI|SUP|CRC|FE wherein: FS is the starting frame delimiter; DA is the destination address of the start-up packet (since a start-up packet is meant for all BIUs, it will contain a general address); SA is the source address (the address of the BIU generating the start-up packet BIU—1 in the example being considered); SD is a bit indicating the sweep direction (right in the example being considered); PI is a byte (of two-bit length) indicating the priority of the sweep; SUP is a bit indicating whether the packet is a start-up packet; CRC is a cyclic redundancy check; and FE is an ending frame delimiter. In the preferred embodiment of the invention, each sweep can have any one of four possible priorities, with a priority 1 sweep being the highest and a priority 4 being the lowest. As will be shown below, each BIU 16 can place its information packet on data bus 12 when two conditions are met: (1) it has received the virtual token being passed down the bus; and (2) the priority of its information packet is greater than or equal to the priority of the sweep. In the presently preferred embodiment, the first sweep initiated by BIU 16-1 has a priority level 4 so as to enable as many BIUs as possible to gain access to the line during the initial sweep. The invention is not, however, limited to a priority level 4 initial sweep. For example, in some cases it might be desirable for the initial sweep to have a priority level 1.

As soon as the start-up packet is placed on bus 12 by BIU 16-1, it propagates to the left towards BIU 16-N. For the purpose of the present description, the propagation delay of the start-up packet is assumed to be negligible and the start-up packet may be assumed to be received by each of the BIUs 16-2 through 16-N at substantially the same time. While this assumption appears to violate physical law, the effect of such assumption will be explained hereinbelow.

As each BIU 16-2, 16-3, . . . , 16-N receives the start-up packet, it copies it and derives the following information from it: (1) the source address, (2) the scan direction, (3) the scan priority level and (4) the start-up packet identification. From this information, each BIU 16 calculates a token receipt time interval ΔT1 unique to that BIU. As will be shown below, this time interval is greater for each successive BIU and represents the maximum time it would take the BIU immediately to its right to place an information packet on bus 12, if that BIU gains access to the bus. If the BIU 16 does not detect the presence of an information packet on bus 12 by the end of the time intervals ΔT1, it has received the virtual token and may place its information packet on bus 12 if the priority of its information packet is greater than or equal to the priority of the sweep. The token is referred to as a "virtual" token since there is no actual signal on bus 12 which corresponds to a token. Rather, the token is implicitly received with the time period ΔT1 after receipt of the start-up packet has expired. If the BIU 16 detects the presence of an information packet on bus 12 before its token receipt time interval T1 expires, it will not receive the token and will not transmit its message. It will, however, calculate a new token receipt time interval based on the organization of the information packet and wait for the receipt of a new token in a manner described below.

For a right sweep, the token receipt time interval ΔT1 is derived in accordance with the following equation:

$$\Delta T1 = (N_T - N_S - 1)T_d \qquad \text{Eq. (1)}$$

wherein $N_T$ is the address of the BIU 16 calculating the time interval, $N_S$ is the address of the BIU 16 which initiated the received start-up or information packet and $T_d$ is a time interval corresponding to the maximum time period required by a BIU to transmit an information packet after it has received the virtual token.

Since all downstream BIUs 16-2, 16-3, . . . 16-N initially, i.e. in the case of a start-up packet, calculate the time interval ΔT1 by substracting its own address from that of the token generator BIU 1, the token receipt time interval ΔT1 for each successive BIU 16 increases by a time interval equal to the delay time $T_d$. Thus, the token receipt time interval ΔT1 for BIU 16-2 is $\Delta T1 = (2-1-1)T_d = 0$, the token interval for BIU 16-3 is $\Delta T1 = (3-1-1)T_d = T_d$, the token interval for BIU 16-4 (not shown) is $\Delta T1 = (4-1-1)T_d = 2T_d$, etc. The reason for this delay is to ensure that each successive BIU does not transmit an information packet until all of the BIUs upstream from that BIU have had an opportunity to transmit their own information packets. Note that the time for propagation of the packet is not a factor, as the actual propagation time required for receipt of the start-up (any any other) packet by any other BIU, from the originating BIU, merely causes the start and end times of the associated ΔT1 interval to be correspondingly later by some propagation time $t_p$. Thus, by assuming a negligible start-up packet propagation delay time, the actual propagation delays (which vary on a system-by-system basis) need not be calculated.

Assuming that none of the BIUs 16-2 through 16-N has information to place on bus 12 during the first right sweep, BIU 16-N (the left token generator) will receive the implicit token generated by BIU 16-1 at a time of $(N-2)T_d$ seconds after the start-up bit is placed on bus 12 by BIU 16-1. At this point, BIU 16-N initiates a left sweep (so called because it is initiated by the left token generator) by placing either a start-up packet or its own information packet on bus 12. The left sweep start-up packet will be identical in form to the right sweep start-up packet, with the exception that the source address byte SA will contain the source address of Biu 16-N (i.e. address N) and the sweep direction bit SD will indicate a left sweep. The priority of the start-up or information packet generated by BIU 16-N will remain at the priority 4 level. In the presently preferred embodiment, the priority level of all start-up packets is level 4 unless the start-up packet is generated in response to a tone signal in the manner described below.

The start-up packet generated by BIU 16-N propagates to the right as viewed in FIG. 1 and is copied by each successive BIU 16-1-N through 16-1 and the information concerning the source address, the sweep direction, the priority level and the start-up bit is stored internally in the BIU. Each BIU again generates a token receipt time interval ΔT1. For a left sweep, however, the time interval ΔT1 is calculated in accordance with the following equation:

$$\Delta T1 = (N_S - N_t 1) T_d \qquad \text{Eq. (2)}$$

If by the end of its respective token receipt time interval ΔT1, each successive BIU 16-N-1 through 16-1 has not detected an additional information packet on bus 12, it will have received the virtual token and will be free to place an information packet on line 12 if the priority of that information packet is greater than or equal to the sweep priority level. In this manner, the token is successively transferred to each BIU 16 until it is again received by BIU 16-1. BIU 16-1 will generate either another start-up packet or an information packet (depending on whether it has an information packet to transmit) and will place that packet on bus 12 to initiate another right sweep. This process continues with alternate left and right sweeps being initiated by the token generators 16-1 and 16-N.

In the foregoing description, it has been assumed that none of the BIUs 16 placed an information packet on bus 12. The effect of placing such a packet on bus 12 will not be described.

As noted above, once a given BIU 16 has received the virtual token, it is free to place an information packet on bus 12 if the priority of its information packet is greater than or equal to the priority level of the sweep. In the preferred embodiment, each BIU 16 is capable of transmitting two types of information packets: a normal packet and a high priority minipacket. The primary difference between the two information packets concerns the amount of information in the packet. A minipacket has relatively few bytes of information while a normal packet has a relatively large number of bytes. Minipackets are used for circuit switching on bus communication system 10. In this mode of operation, the message or packet receive time from the terminal is made to appear as short as possible. Typically, the communications between terminal 14 and BIUs 16 is very slow in comparison with the transmission speed of bus 12. For example, it will take 0.666 seconds for a BUS 16 to receive a 100-character message from a synchronous terminal operating at 1200 baud. The use of circuit switching overcomes this delay problem by forming and transmitting a minipacket as BIU 16 receives a few bytes of information from terminal 14. In some cases, computer-terminal software/hardware protocols are designed for communication over telephone lines which do not have delays such as the one desired above. For example, an IBM 370 computer operating with the BSC protocol will disconnect if it experiences 0.666 seconds packet formation delay. Such user applications are not suitable for system operation in packet switched mode. Moreover such packet formation delays such as the one described above increases end-to-end delay variance. The end-to-end delay variance is the most important system parameter for the transmission of encoded voice in bus communication systems 10. For example, a BIU can be configured such that one or more ports are dedicated (e.g. hardwired) to a user terminal which provides data (e.g. encoded voice) requiring circuit switching (e.g. as by the use of minipackets in time division-multiplexing manner); whenever that BIU port receives a previously-assigned (e.g. two) bytes of incoming data in a buffer, a minipacket is formed and transmitted. Hence, the use of circuit switching in such systems overcomes the protocol problems of the computer/terminals designed for use with telephone lines, i.e. communications links having no appreciable delays, and allows low cost encoded voice transmission. A minipacket may take the following form:

FS DA SA SD PI SUP INFO CRC FE wherein: FS is the starting frame delimiter; DA is the destination address (the address of both the BIU and the user terminal to which the information is to be sent); SA is the source address (the address of the BIU transmitting the minipacket); SD is the sweep direction (the direction of the present sweep as initiated by one of the two token generators BIU 16-1 or BIU 16-N); PI is a byte indicating the priority level of the information packet (1 for a minipacket); SUP is a bit indicating whether the packet is a start-up packet; INFO is the information to be transmitted; CRC is the cyclic redundancy check; and FE is the ending frame delimiter.

A normal packet may take the identical form of the minipacket except that it has a much larger number of bytes in its INFO section. A normal packet will be used whenever it is desired to operate in a packet-switched mode on bus communication system 10. The effect of the placement of either a mini or a normal packet on bus 12 is to cause each downstream BIU (the BIUs to the left of the BIU transmitting the information packet during a right sweep and the BIUs to the right of the BIU transmitting the information packet during a left sweep) to recalculate the token receipt time interval ΔT1 in accordance with equations (1) or (2) and to reset the priority level of the sweep in accordance with the priority level indicated by the information packet. To better explain this concept, it will be assumed that BIU 16-1 has initiated a right sweep by placing a start-up packet on line 12, that BIU 16-2 does not transmit an information packet when it receives the token and that BIU 16-3 places a priority level 2 packet on bus 12 when it receives the token (i.e. $2T_d$ seconds after the start-up packet was placed on bus 12). When the information packet is placed on transmission bus 12, it propagates both to the left and to the right of BIU 16-3. As each BIU receives the information packet, it copies the packet and examines its header (DA|SA|SD|PI|SUP) to determine the destination address, source address, sweep direction, priority level and the status of the start-up packet identification of the packet. Since BIUs 16-1 and 16-2 know that bus communication system 10 is presently in a right sweep (this was indicated by the sweep direction bit located in the start-up packet generated by BIU 16-1), they ignore the receipt of the information packet for the purpose of token passing. These BIUs do use the header information from the information packet to recalculate a return sweep time interval ΔT2 as described below. These BIUs also examine the destination address of the information packet to determine if the packet is meant for its associated user terminal (i.e. user terminals 14-1 or 14-2). If the information is meant for one of these user terminals, the associated BIU 16-1 or 16-2 will transmit the information to its associated user terminal in any known manner. Since the transmission of information between BIUs and user terminals is not part of the bus accessing scheme of the present invention, it will not be described further herein.

As each BIU to the left (upstream) of the BIU 16-3 receives the information packet, it generates a new token receipt time interval $\Delta T1$ in accordance with equation (1). This time interval will be less than the initial time interval calculated since BIU 16-3 has a higher address than that of BIU 16-1. If a BIU 16 does not receive a further information packet by the end of the newly calculated token recept time interval $\Delta T1$, it will have received the implicit token. That BIU will then place its information packet on bus 12 within $T_d$ seconds after the receipt of the token, if it has information to transmit and if the priority level of that information is greater than or equal to the present priority of the sweep (priority level 2 in the example being considered). If any of the BIUs downstream of BIU 16-3 does generate another information packet when it receives the token, it will cause all of the BIUs downstream of that BIU to generate a new token receipt time interval $\Delta T1$, will establish a new sweep priority (the priority of the priority byte PI of the information packet) and the process will be repeated.

When the token receipt time interval $\Delta T1$ of BIU 16-N finally times out, BIU 16-N will receive the token and will initiate a left sweep by placing either a start-up packet or an information packet on bus 12. If BIU 16-N does not have information to transmit, it will generate a level 4 start-up packet. In the event that BIU 16-N has an information packet to transmit, it will initiate a left sweep by applying the information packet to bus 12. The priority level of the information packet will be set to level 4. When BIU 16-1 receives the token, it will place a priority 4 start-up packet or an information packet (if it has one to transmit) on bus 12 to start a right sweep. This process is continually repeated with the result that information is transmitted between each of the BIUs 16 using a non-contention token passing method which assures rapid access to the bus and prevents collision of information packets with the resultant loss of information and need to retransmit the information.

While the token passing system provides relatively fast access to bus 12 for all the BIUs 16, a given BIU 16 may have to wait for almost two complete sweeps to gain access to the line. For example, if BIU 16-2 acquires a minipacket for transmission a moment after the token is received (during a right sweep) by BIU 16-3, BIU 16-2 will not gain access to bus 12 until the token is passed all the way to BIU 16-N and is returned during a left sweep to BIU 16-2. For this reason, each BIU 16 preferably includes a tone generator which enables it to gain priority access to the line. Each BIU will use the tone to gain access to bus 12, whenever it has a level 1 priority minipacket to transmit and it detects that an information packet has been placed on the bus 12. If no information packet is on the bus 12, the BIU 16 will not generate the tone but will merely wait until it receives the virtual token before it transmits its packet.

To gain access to the bus 12, the BIU with the high priority minipacket (e.g. BIU 16-2) will generate a high frequency tone and place it on the bus 12. The tone will have a frequency which does not interfere with the harmonics of the base band or modulated radio frequency signal in which the information packets are being transmitted. Since the tone is of a frequency which will not interfere with the information packets, any information packet presently being transmitted by a given BIU 16 will be received by the BIU 16 to which it is addressed. As such, no loss of information will occur as a result of the placement of the tone on bus 12.

The tone will remain on bus 12 for a period of time sufficient to enable each of the BIUs 16 to detect it. In response to the tone, one of the two token generators (e.g. the token generator which initiated the last sweep) will generate a start-up packet and place the same on bus 12. In the preferred embodiment, the BIU which generated the tone (e.g. BIU 16-2) is the first BIU which is permitted to gain access to bus 12 in response to the start-up packet. This result may be achieved by including an additional tone bit in the header of the start-up packet. This tone bit will be placed at a predetermined binary level (i.e. "0" or "1") by the token generator whenever a start-up packet is initiated in response to the generation of a tone signal. As the start-up packet is copied by each of the BIUs, each BIU will examine this tone bit to determine if the start-up packet has been generated in response to a tone. If it has, only the BIU 16 which generate the tone will be permitted to generate an information packet in response to the start-up packet. Alternatively, all BIUs 16, except the BIU which generated the tone signal, can be programmed to suppress a transmission operation upon receipt of the first packet after the tone has been placed on bus 12. In the example being considered, BIU 16-2 will be the first BIU to obtain the token and will place its minipacket on bus 12 in response thereto. Thereafter, each of the BIUs upstream of BIU 16-2 will compute a new token receipt time interval $\Delta T1$ using the information contained in the header of the minipacket transmitted by BIU 16-2. Sweep sequences then continue in the normal manner.

In accordance with the foregoing embodiment, each BIU 16 will place a tone on transmission bus 12 whenever it has a priority 1 minipacket to transmit. It desired, three different sets of tones can be used to indicate packets having first, second and third level priorities. If a tone corresponding to a first level priority is generated, the token generator which intiated the present sweep generates a start-up packet having a level 1 priority. If the tone corresponding to a level 2 priority is generated, the token generator which initiated the present sweep generates a start-up packet having a level 2 priority. If a tone corresponding to a level 3 priority is placed on bus 12, the token generator which initiated the present sweep places a start-up packet on bus 12 having a level 3 priority.

In the event that transmission bus 12 is broken, bus communication system 10 will be separated into two sybystems, one of which contains a left token generator only, the remaining one of which contains a right token generator only. This would result in the loss of generation of return sweeps and the user terminals 14 could no longer communicate with each other. A similar result would occur if either of the token generators 16-1 or 16-N failed to operate properly.

In order to overcome this problem, each of the BIUs 16 converts itself to a token generator and generates a start-up packet whenever it fails to detect a start-up packet or an information packet forming part of a return sweep within a predetermined time period after it receives the token. To this end, each of the BIUs (e.g., BIU 16-3) calculates a return sweep time interval ΔT2 and monitors bus 12 to see if a return sweep packet appears on bus 12 ΔT2 seconds after it receives a token. The return sweep time interval ΔT2 represents the maximum length of time it will take the given BIU (e.g., BIU 16-3) to receive a return sweep start-up or information packet from any of the downstream BIUs 16 (e.g., BIUs 16-4 through 16-N for a right sweep). If the bus communication system 10 is presently sequencing in a right sweep, each BIU 16 will calculate the return sweep time interval ΔT2 in accordance with the following equation as it receives the token:

$$\Delta T2 = (N_{GL} - N_T) 2 T_d \qquad \text{Eq. (3)}$$

wherein $N_{GL}$ is the address of the left token generator (i.e. BIU 16-N) and $N_T$ and $T_d$ are as defined above.

As the token is passed to the left, each of the downstream BIUs 16 (e.g. BIUs 16-4 though 16-N) has an opportunity to place a right sweep information packet on bus 12. If any downstream BIU 16 does place a right sweep information packet on bus 12, the end of this packet will be detected by each of the upstream BIUs 16 which will then generate a new return sweep time interval ΔT2 in accordance with the following equation:

$$\Delta T2 = (N_{GL} - N_T) T_d + (N_{GL} - N_S) T_d \qquad \text{Eq. (4)}$$

wherein $N_{GL}$ is the address of the left token generator (i.e. BIU 16-N), $N_T$ is the address of the BIU performing the calculation, $T_d$ is the delay time defined above and $N_S$ is the address of the source of the information packet.

If any BIU 16 (e.g. BIU 16-3) does not detect the presence of either a left sweep start-up packet or a left sweep information packet on bus 12 before the expiration of time interval ΔT2, it will assume that either bus 12 has been cut at a location to its left or that all of the BIUs 16 to its left are inoperative and will therefore convert itself to a token generator. The BIU 16 (e.g., BIU 16-3) will then generate either a left sweep start-up packet or a left sweep information packet (depending upon whether it has information to transmit) and will then continue to operate as the left-hand token generator.

If bus communication system 10 is present sequencing in a left sweep, each BIU 16 will, upon receipt of the left sweep token, compute the return token time interval ΔT in accordance with the following equation:

$$\Delta T2 = (N_T - N_{GL}) 2 T_d \qquad \text{Eq. (5)}$$

wherein $N_T$, $N_{GL}$ and $T_d$ are as defined above. If any of the downstream BIUs 16 places a left sweep information packet on bus 12, after detecting the end of this packet each BIU calculates a new return token time interval ΔT2 in accordance with the following equation:

$$\Delta T2 = (N_T - N_{GL}) T_d + (N_S - N_{GL}) T_d \qquad \text{Eq. (6)}$$

wherein $N_{GL}$, $N_T$, $N_S$ and $T_d$ are as defined above.

In the event that the BIU 16 does not receive either a right sweep start-up packet or a right sweep information packet ΔT2 seconds after it has received its last token, it assumes that either bus 12 has been cut to its right or that the BIUs to its right are no longer functioning. In such a case, the BIU 16 converts itself to a right sweep token generator and places either a right sweep start-up packet or a right sweep information packet on bus 12.

As a result of the foregoing, each of the BIUs in any subsystem of bus communication system 10 created by one or more breaks in the bus 12 will be able to continue communicating with each other. The BIUs 16 also will be able to communicate with each other if any of the token generators are disabled.

Having described the general bus accessing method of the present invention, the preferred structures of the bus interface units 16, insofar as this structure relates to the bus accessing system of the present invention, will now be described with reference to FIGS. 2 through 16. The heart of each BIU of bus communication system 10 is a microprocessor 18 which executes the program instructions which are stored in a ROM 20. The program for carrying out the present invention is illustrated in flow diagram form in FIGS. 9–16. In order to obtain the sequential program instructions contained in ROM 20, microprocessor 18 generates the address of the next program step on address bus 22 and applies it to ROM 20. Typically, address bus 22 includes 16 address lines, 12 of which are used to address the ROM 20. A thirteenth line is applied to the output enable input terminal OE of ROM 20 and enables ROM 20 when the active low $\overline{\text{NB MEM EN}}$ signal is applied to the clock enable terminal CE thereof.

Throughout the following description, reference will be made to signals which are either active low or active high. An active low signal will be indicated by the preence of a line over the signal (e.g., $\overline{\text{MEM EN}}$). An active low signal will be referred to as being set or generated when it is at the binary "0" level and reset when it is at the binary "1" level. An active high signal will be indicated by the absence of a line over the signal (e.g., DMA RECEIVED). An active high signal will be referred to as being set or generated when it is at the binary "1" level and being reset when its is at the binary "0" level.

In addition to active low and active high signals, various elements of BIU 16 have active high and active low inputs and outputs. An active low input or output will be indicated by the presence of a small circle at the input or output of the element. For example, each of the outputs of three-to-eight decoder 28 (FIG. 2) are active low outputs. An active low input will be activated by the presence of a binary "0" on its input. An active low output will place a binary "0" on its output when it is activated. Any input or output which is not indicated to be active low is active high.

When ROM 20 is enabled by $\overline{\text{NB MEM EN}}$, the next program instruction will be placed on data bus 24 and will be applied to the DATA input of microprocessor 18 via transceiver 26 and data bus 24A. Transceiver 20 is bi-directional. As such, transceiver 26 will reproduce the data placed on data bus 24 onto the data bus 24A whenever the $\overline{\text{NE READ}}$ signal set by microprocessor 18 and will reproduce the data placed on data bus 24A onto data bus 24 whenever $\overline{\text{NB READ}}$ is reset. Accordingly, whenever microprocessor 18 wishes to read information on bus 24, it sets $\overline{\text{NB READ}}$ and whenever it wishes to write information onto data bus 24, it resets $\overline{\text{NB READ}}$. Microprocessor 18 reads its next program instruction by placing the correct address on address bus 22 and by setting both the $\overline{\text{NB MEM EN}}$ and $\overline{\text{NB READ}}$ signals.

In order to control the operation of BIU 16 in accordance with the program stored in ROM 20, microprocessor 18 must generate the command signals $\overline{\text{NB MEM EN}}$, $\overline{\text{NB I/O REQ}}$, $\overline{\text{NB WRITE}}$, $\overline{\text{NB READ}}$, $\overline{\text{NB STATUS RD}}$, $\overline{\text{NB STATUS WR}}$, $\overline{\text{NB INTR RESET}}$, $\overline{\text{RESET NB CTC}}$, CTC ENABLE, TONE START, TONE STOP, DMA RECEIVE, DMA XMIT and $\overline{\text{CLEAR 1}}$. Most commercially available microprocessors are provided with standard outputs such as MREQ, IORQ, WR, RD, as well as its address and data lines (referred to cumulatively as address and data buses, respectively). These outputs are utilized to generate the four command signals $\overline{\text{NB MEN EN}}$, $\overline{\text{NB I/O REQ}}$, $\overline{\text{NB WRITE}}$, and $\overline{\text{NB READ}}$. These four signals are not, however, sufficient to control all of the subcomponents of BIU 16. For this reason, microprocessor 18 utilizes a three to eight decoder 28 and a register 30 for the purpose of generating the additional control signals.

The decoder 28 enables a single one of its outputs whenever an enable signal is applied to its enable input E. The particular output enabled will be determined by the three bit address applied to its data input D. Whenever microprocessor 18 wishes to generate one of the control signals appearing at the outputs of decoder 28, it places the appropriate address on the correct three lines of address bus 22 and generates the $\overline{\text{NB I/O REQ}}$ signal on its IORQ output. This signal is applied to the enable input E of decoder 28 and causes the appropriate output of decoder 28 to be set. The control signals appearing at the output of register 30 are determined by the state of three data lines of data bus 24. Particularly, register 30 latches the data appearing on these three lines to its three outputs whenever the $\overline{\text{NB STATUS WR}}$ signal is set by microprocessor 18.

At various points in its program, microprocessor 18 must determine the occurrence of specific events. Thus, microprocessor 18 must know when a new start-up or information packet has been detected by BIU 16 (this is indicated by the $\overline{\text{CARRIER}}$ signal); it must know if the packet received by the BIU 16 is a valid packet (this is indicated by the NB CRC signal); it must know both when an entire packet has been received by BIU 16 and when an entire packet has been transmitted by BIU 16 (both of these events are indicated by the $\overline{\text{DONE INTR}}$ signal; and it must know when the BIU 16 has recognized the presence of a tone on bus 12 (this is indicated by the $\overline{\text{TONE}}$ signal). These signals are read into the DATA input of microprocessor 18 via a buffer 32 and transceiver 26. Buffer 32 will transfer the four signals applied to its data inputs D0 through D3 to four respective data lines of data bus 24 whenever the $\overline{\text{NB STATUS RD}}$ signal is set. Accordingly, whenever microprocessor 18 wishes to detect the status of these signals, it causes decoder 28 to set the $\overline{\text{NB STATUS RD}}$ signal, and it sets the $\overline{\text{RD ENABLE}}$ control signal itself. In this manner, microprocessor 18 can periodically poll buffer 32 to defect the status of these signals.

In addition to the information received by its DATA input, microprocessor 18 receives a clock signal CL2 at its CLK input and receives first and second interrupt signals $\overline{\text{INTR 1}}$ and $\overline{\text{INTR 2}}$ of its INTR and NMI inputs, respectively. The clock signal CL2 is used by microprocessor 18 to sequence itself through its various operations. The first interrupt signal $\overline{\text{INTR 1}}$, when applied to its INTR input, causes microprocessor 18 to complete whatever program step it is presently carrying out and to immediately enter an interrupt subroutine (see FIG. 9) which will cause microprocessor 18 to poll buffer 32 and determine the status of the various input signals thereto. At least one of the inputs to buffer 32 will be set and will indicate the occurrence of a certain event (e.g., the receipt of the first bit of a new information packet as indicated by the presence of the $\overline{\text{CARRIER}}$ signal). Microprocessor 18 will note this fact and will set a flag indicating the occurrence of that event by placing a binary "1" (or alternatively a binary "0", as desired) in a predetermined location in RAM memory 34 (see FIG. 3). Throughout this description, reference will be made to flags which are set by microprocessor 18. In each case, specific storage locations in memory 34 will correspond to the flag in question. When the microprocessor wishes to set the flag, it places a predetermined logic bit (i.e., "0" or "1") in that memory location. The manner in which these bits are stored in RAM memory 34 will be described in greater detail below. After the flag is set in RAM memory 34, microprocessor 18 returns to the point in the program at which it had left off and continues the program sequence.

Whenever the second interrupt signal $\overline{\text{INTR 2}}$ is applied to the NMI input of microprocessor 18, microprocessor 18 will complete its present program instruction, and will set a flag in memory 34 indicating that the token timer 36 has run out (which in turn indicates that one of the time intervals $\Delta T1$ or $\Delta T2$ has expired). Thereafter, microprocessor 18 will return to the point in the program where it left off when it received the $\overline{\text{INTR 2}}$ signal.

The token timer 36 times the token time interval $\Delta T1$ and the return sweep time interval $\Delta T2$ which are calculated by microprocessor 18 in accordance with equations (1) through (6), supra. Each time microprocessor 18 generates a new time interval $\Delta T1$ or $\Delta T2$, it resets token timer 38 by applying a binary signal indicative of the newly calculated time interval $\Delta T1$ or $\Delta T2$ to the DATA input of timer 36 and generates both the $\overline{\text{NB I/O REQ}}$ and $\overline{\text{NB READ}}$ signals. This causes a binary number corresponding to the time interval $\Delta T1$ or $\Delta T2$ to be read into token timer 36. When the time interval is to begin timing out (e.g., upon receipt of the entire start-up packet as indicated by the generation of the $\overline{\text{DONE INTR}}$ signal), microprocessor 18 enables token timer 36 by causing decoder 28 to set token timer enable signal $\overline{\text{CTC ENABLE}}$. When this signal is applied to the clock enable input CE of token timer 36, the token timer will begin counting down from the number which has been read into timer 36 at a rate determined by the clock signal CL1. When the count in token timer 36 is reduced to zero, the time interval $\Delta T1$ or $\Delta T2$ will have timed out and timer 36 will generate a negative going pulse ($\overline{\text{INTR 2}}$) in its INT output. This pulse is applied to microprocessor 18 and informs the microprocessor that the time interval $\Delta T1$ or $\Delta T2$ has expired. This signal is also applied to transmit enable circuit 104 which initiates a transmit operation in the manner described below.

The clock signal CL1 applied to the CLK input of token timer 36 is gated by AND gate 38 which is enabled by the Q output of flip-flop 40. The Q output of flip-flop 40 is set by the generation of the $\overline{\text{DONE INTR}}$ signal which is applied to the CLK input of flip-flop 40 via inverter 42. The flip-flop 40 is reset in response to the generation of the interrupt signal $\overline{\text{INTR 2}}$ generated by token timer 36 when token timer 36 times out. This disables AND gate 38, preventing additional clock signals from being applied to token timer 36.

As will be described in further detail below, token timer 36 is reset whenever a new start-up or information packet is received by BIU 16. Upon recognition of such a packet, microprocessor 18 causes decoder 28 to generate the token timer reset signal $\overline{\text{RESET NB CTC}}$ which is applied to the reset input RS of token timer 36, clearing the contents of the timer.

Figure 5:
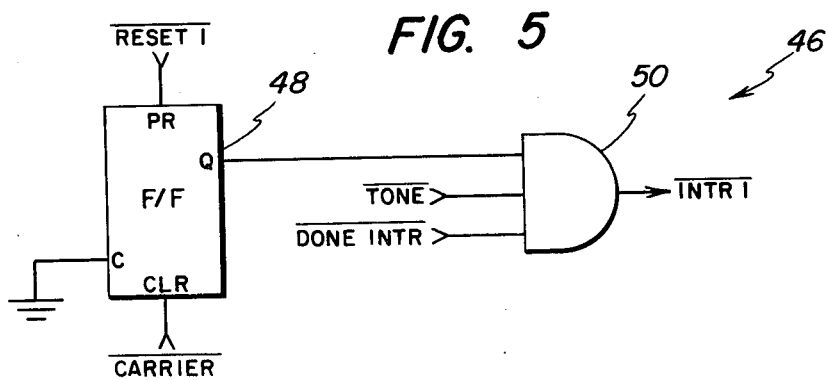

The interrupt signal $\overline{\text{INTR 1}}$ is generated by interrupt signal generator circuit 46 which is illustrated in FIG. 5. Circuit 46 includes a flip-flop 48 and a three-input AND gate 50. The clear input CLR of flip-flop 48 receives the $\overline{\text{CARRIER}}$ signal (generated by a modem 54 and amplified by a line driver 52, see FIG. 3) which is set whenever modem 54 receives a start-up or information packet from bus 12. Accordingly, the $\overline{\text{CARRIER}}$ signal is set when the first bit of a start-up information packet is received by modem 54 and stays set for the entire duration of the packet.

When the $\overline{\text{CARRIER}}$ signal is set, the Q output of flip-flop 48 is reset causing the generation of the interrupt signal $\overline{\text{INTR 1}}$. The interrupt signal $\overline{\text{INTR 1}}$ remains set until flip-flop 48 is reset by the $\overline{\text{RESET 1}}$ signal generated by register 30 under the control of microprocessor 18. After microprocessor 18 has detected the presence of the $\overline{\text{INTR 1}}$ signal on its INTR input, it causes the generation of the $\overline{\text{RESET 1}}$ signal so as to reset the $\overline{\text{INTR 1}}$ signal.

The $\overline{\text{INTR 1}}$ signal is also generated when either the $\overline{\text{TONE}}$ or $\overline{\text{DONE INTR}}$ signals are generated. The $\overline{\text{TONE}}$ signal is generated by tone receiver circuit 56 which is illustrated in FIG. 7. Tone receiver circuit 56 includes a high frequency filter 58 which is connected to the information bus 12 and receives any tone signal applied thereto. The output of filter 58 is applied to a wideband amplifier 60 which amplifies the filtered signal and applies it to the non-inverting input terminal of a comparator 62. The magnitude of the output of amplifier 60 varies as a function of the frequency of the tone on bus 12. The closer the frequency of the signal on bus 12 is to a predetermined tone frequency, the greater the amplitude of the output of amplifier 60. By properly adjusting the magnitude of the signal applied to the inverting input terminal of comparator 62, it is possible to cause the output of comparator 62 to be set whenever a tone signal is located on bus 12. The output of comparator 62 is applied to the input of a retriggerable one-shot multivibrator 64 whose output is connected to an inverter 66. The output of inverter 66 is the $\overline{\text{TONE}}$ signal which will be set as long as a tone signal appears on bus 12.

Returning again to FIG. 5, it can be seen that the interrupt signal $\overline{\text{INTR 1}}$ will be set whenever the $\overline{\text{TONE}}$ signal is generated by tone receiver circuit 56. Accordingly, the $\overline{\text{INTR 1}}$ signal will be set whenever a tone is placed on bus 12 and received by the BIU 16.

Figure 4:
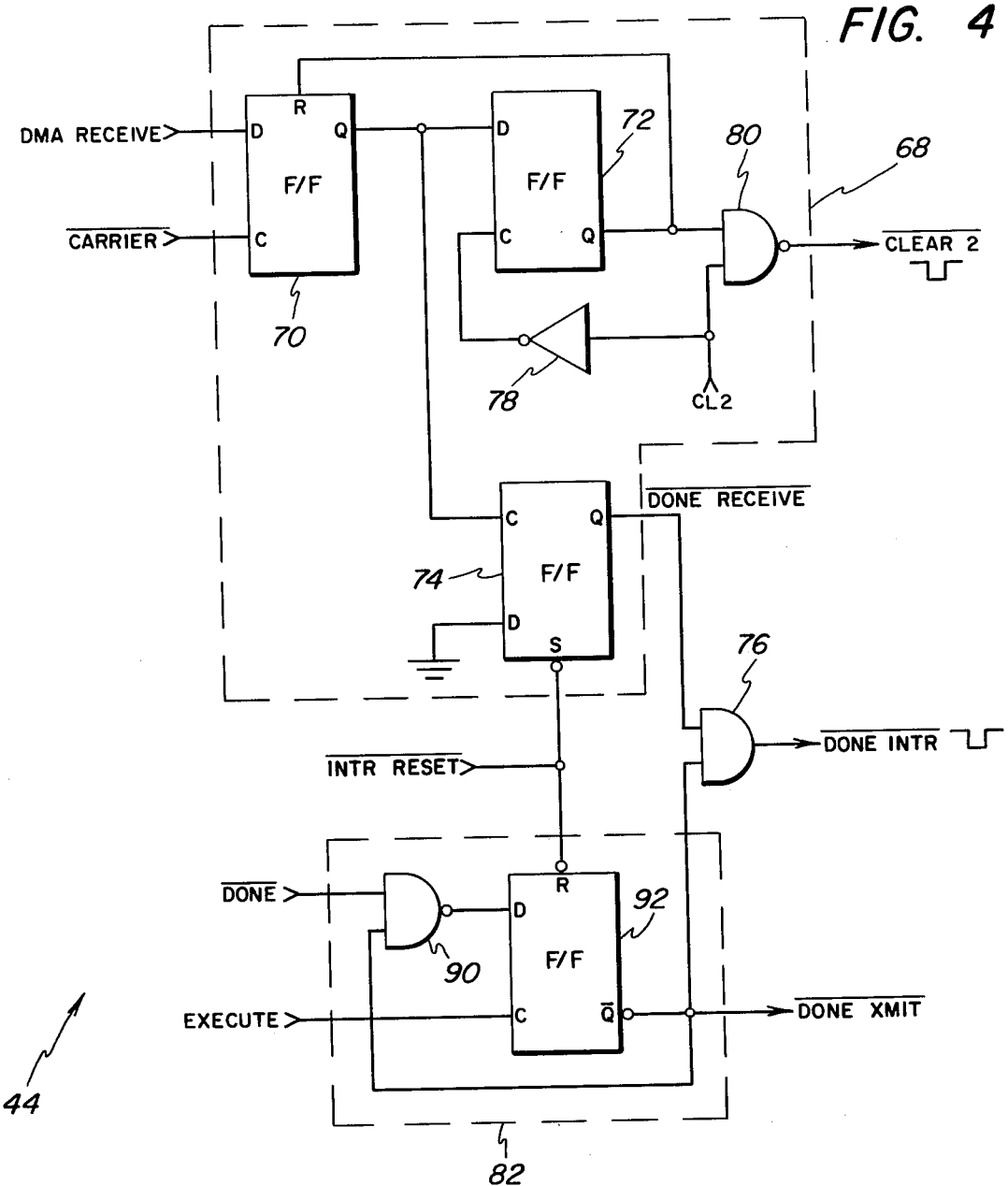

The remaining input to AND gate 50 is the $\overline{\text{DONE INTR}}$ signal generated by interrupt circuit 44 (see FIG. 4). Interrupt circuit 44 generates the $\overline{\text{DONE INTR}}$ signal whenever BIU 16 has completed a receive operation (wherein a received information or start-up packet has been placed in RAM memory 34) or has completed a transmission operation (wherein a stored information or start-up packet has been transferred from RAM memory 34 to bus 12). The completion of a receive operation is detected by receive packet detect circuit 68, which monitors the state of the $\overline{\text{CARRIER}}$ signal and generates the $\overline{\text{DONE RECEIVE}}$ signal when an entire information or start-up packet has been received by BIU 16. To this end, the CARRIER signal is applied to the clock input C of a flip-flop 70 whose data input D receives the DMA RECEIVE signal, generated by register 30 under the control of microprocessor 18 when BIU 16 is in the receive mode (i.e. it is monitoring the condition of bus 12 to receive either an information or start-up packet). When a receive operation is completed, the $\overline{\text{CARRIER}}$ signal will be reset causing the information on the data input D of flip-flop 70 to be applied to the Q output thereof. Assuming that BIU 16 is in the receive mode, the output Q of flip-flop 70 will be set and will be applied to both the data input of flip-flop 72 and to the clock input of flip-flop 74. The binary "1" applied to the clock input C of flip-flop 74 causes the binary "0" applied to its data input D to its Q output. As a result, the Q output of flip-flop 74 will be set causing the generation of the $\overline{\text{DONE RECEIVE}}$ signal. The $\overline{\text{DONE RECEIVE}}$ signal is applied to AND gate 76 which generates the $\overline{\text{DONE INTR}}$ signal in response thereto. The $\overline{\text{DONE RECEIVE}}$ signal, and with it the $\overline{\text{DONE INTR}}$ signal, remains set until the $\overline{\text{INTR RESET}}$ signal is applied to the set input of flip-flop 74. The $\overline{\text{INTR RESET}}$ signal is generated by decoder 28 under the control of microprocessor 18 after microprocessor 18 has detected the generation of the $\overline{\text{DONE INTR}}$.

In addition to generating the $\overline{\text{DONE RECEIVE}}$ signal, receive detect circuit 68 also generates the $\overline{\text{CLEAR 2}}$ signal which is applied to various element of the BIU 16 to clear the same after a receive operation has been completed. The $\overline{\text{CLEAR 2}}$ signal is a negative going pulse which is generated in response to the $\overline{\text{CARRIER}}$ signal being reset. To generate this signal, for Q output of flip-flop 70 is applied to the data input D of flip-flop 72 and is clocked into the Q output of flip-flop 72 by the system clock signal CL2 which is applied to the clock input C of flip-flop 72 via inverter 78. This causes the Q output of flip-flop 72 to set and enable the output of NAND gate 80 upon receipt of the next system clock pulse CL2. Since the Q output of flip-flop 72 is also applied to the reset input R of flip-flop 70, the Q output of flip-flop 70 is reset thereby resetting the $\overline{\text{CLEAR 2}}$ signal upon receipt of the next clock pulse.

The completion of a transmit operation is detected by transmit packet detect circuit 82 which generates the $\overline{\text{DONE XMIT}}$ signal when the transmit packet operation has been completed. To this end, transmit packet detect circuit 82 detects the condition of the $\overline{\text{DONE}}$ and EXECUTE signals generated by memory controller 84 (see FIG. 3). In a manner which is explained in further detail below, memory controller 84 controls the transfer of information into and out of RAM memory 34. RAM memory 34 will receive information from three sources: (1) from packet receive circuit 86 which receives the information and start-up packets from transmission bus 12; (2) from microprocessor 18; and (3) from the user terminal 14. Information stored in RAM memory 34 may be transmitted to three locations: (1) to packet transmit circuit 88 which transmits information packets onto transmission bus 12; (2) to micrprocessor 18; and (3) to the user terminal 14. As noted above, transfer of information between user terminal 14 and BIU 16 (i.e. between user 14 and RAM memory 34) does not form part of the bus accessing scheme of the present invention. Accordingly, transfer of information between user terminal 14 and RAM memory 34 will not be considered in the present description.

Whenever memory controller 84 completes a transfer of a full information packet either from a packet receive circuit 86 to RAM memory 34 or from RAM memory 34 to a packet transmit circuit 88, it sets the $\overline{\text{DONE}}$ signal appearing at its DONE output. Whenever memory controller 84 completes any memory access operation (i.e. to or from microprocessor 18, from packet receive circuit 86 or to packet transmit circuit 88), regardless of the size of the information being transferred, it generates the EXECUTE signal on its EXEC output.

Returning again to FIG. 4, the $\overline{\text{DONE}}$ signal is applied to a NAND gate 90 whose remaining input receives the $\overline{Q}$ output of flip-flop 92. The $\overline{Q}$ output of flip-flop 92 will normally be set with the result that the output of NAND gate 90 will be reset whenever the $\overline{\text{DONE}}$ signal is generated by memory controller 84. The signal appearing at the output of NAND gate 90 is clocked into flip-flop 92 by the EXECUTE signal generated by memory controller 84. Since both the $\overline{\text{DONE}}$ and EXECUTE signals will be generated by memory controller 84 at the end of a transmit operation, the $\overline{Q}$ output of flip-flop 92 will be set causing the generation of the $\overline{\text{DONE XMIT}}$ signal. The $\overline{\text{DONE XMIT}}$ signal is applied to AND gate 76 causing the generation of the $\overline{\text{DONE INTR}}$ signal which will remain set until the $\overline{\text{INTR RESET}}$ signal is generated by decoder 28 under the control microprocessor 18. Microprocessor 18 will generate $\overline{\text{INTR RESET}}$ signal once it has detected the generation of the $\overline{\text{DONE INTR}}$ signal.

Figure 3:
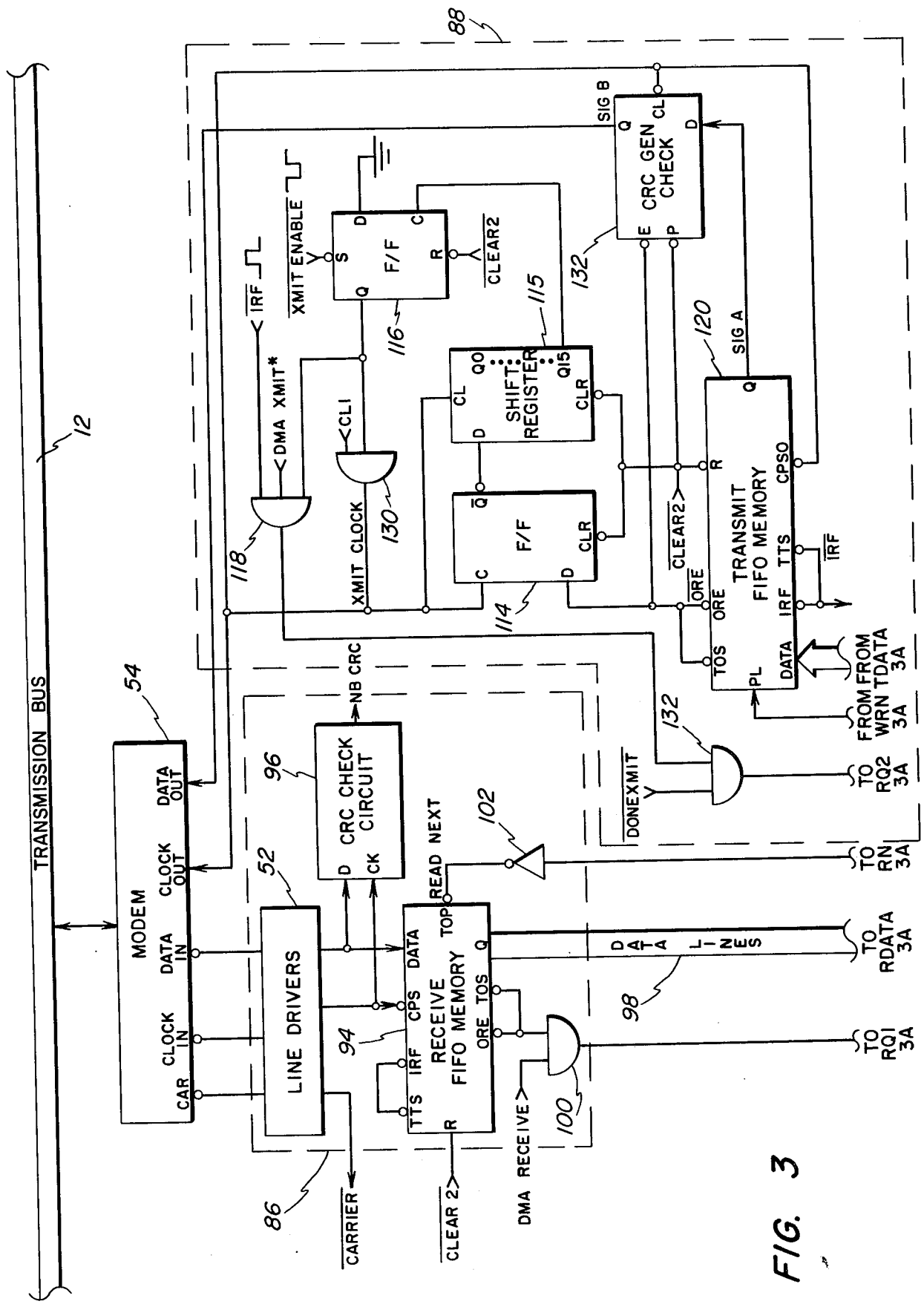

Referring now to FIG. 3, the information and start-up packets appearing on transmission bus 12 are applied, in serial form, to the receive packet circuit 86 by modem 54. The heart of receive packet circuit 86 is a receive FIFO memory 94 which receives, via line driver 52, the serial data appearing at the DATA IN output of modem 54. The serial bits of the received packet are clocked into FIFO memory 94 by the clock signals appearing at the CLOCK IN output of modem 54. As the data is clocked into FIFO memory 94, it is also applied to a CRC check circuit 96 which examines the cyclic redundancy check bits of the received packet to ensure that the packet contains reliable information. If it does, circuit 96 generates the CRC signal which is applied to buffer 32 (FIG. 2) and detected by microprocessor 18. When microprocessor 18 detects the presence of the CRC signal, it knows that the information received by BIU 16 is reliable and can execute its various program instructions on the basis of this information. While any CRC check circuit may be used, one acceptable circuit is a 9401 CRC generator check circuit.

Once the information or start-up packet has been read into FIFO memory 94 in serial form, it is transferred in parallel form to RAM memory 34 under the control of memory controller 84. The specific structure of memory controller 84 does not form part of the present invention. Accordingly, only the signals into and out of controller 84 will be described herein. In the preferred embodiment, memory controller 84 uses direct memory access (DMA) techniques to transfer information into and out of RAM memory 34. One commercially available memory controller which will perform this function is the 8257 programmable DMA controller manufactured by Intel.

If bus communication system 10 is operating properly, an information or start-up packet will appear on transmission bus 12 only when BIU 16 is operating in the receive mode. Microprocessor 18 places BIU 16 in the receive mode by generating the DMA RECEIVE signal, which enables AND gate 100. As soon as an information or start-up packet appears on transmission bus 12, modem 54 sets the $\overline{\text{CARRIER}}$ signal which causes the generation of the $\overline{\text{DONE INTR}}$ signal which alerts microprocessor 18 to the fact that a new packet is being received by BIU 16. In order to prepare memory controller 84 to write this signal into the proper memory locations of RAM memory 34, microprocessor 18 sets the $\overline{\text{NB WRITE}}$ signal (indicating that information should be written into RAM memory 34), places the address of the location in RAM memory 34 wherein the first bit of the received packet should be placed on address bus 22, places the maximum number of bits of the received packet (i.e. the number of bits in a normal information packet) on data bus 24 and resets the $\overline{\text{NB MEM EN}}$ signal (indicating that information should be transferred from packet received circuit 86 to RAM memory 34 rather than from microprocessor 18 to RAM memory 34). Having received this information, memory controller 84 can automatically transfer the digital information contained in FIFO memory 94 to the appropriate locations of RAM memory 34 once a sufficient portion of the packet being received has been placed in FIFO memory 94.

The serial bit information appearing at the DATA IN output of modem 54 is applied in serial form to the DATA input of FIFO memory 94. FIFO memory 94 is preferably a 9403 FIFO buffer memory manufactured by Fairchild Semiconductor. The serial data will be clocked into FIFO memory 94 at a frequency determined by the clock pulses appearing at the CLOCK IN output of modem 54 and applied to the serial clock input CPS of FIFO memory 94. Once four bits of data have been read into the input register of FIFO memory 94, its input register full output IRF will be set causing the four bits of data to be transferred to the output register of FIFO memory 94. The transfer data to the FIFO register will be indicated by the output register empty output of FIFO memory 94 which will be reset. Assuming that BIU 16 is operating in the receive mode (as indicated by the generation of the DMA RECEIVE signal by microprocessor 18), the transfer of the four bits of data to the output registers of FIFO memory 94 cause the generation of the REQ 1 signal which is applied to the RQ1 input of memory controller 84. This signal informs memory controller 84 that FIFO memory has a four bit word stored in its output register which is ready to be transferred to memory controller 84. To complete the transfer, memory controller 84 generates the READ NEXT pulse which is applied to the parallel output enable input TOP of FIFO memory 94 via inverter 102. In response to this signal, FIFO memory 94 places the four bit word located in its output register on data lines 98. Memory controller 84 accepts this information and places it in the memory locations of RAM memory 34 identified by address and data buses 22 and 24 by placing the appropriate bits on address and data lines 124, 126 and by setting the M WRITE signal.

While this transfer of information from FIFO memory 94 to memory controller 84 is being completed, additional bits are being read into the input register of FIFO memory 94. Once four new bits of information has been read into the input register of FIFO memory 94, they will be transferred to the output register causing AND gate 100 to generate another REQ 1 pulse.

The process is repeated until the entire packet of information received by BIU 16 is placed in RAM memory 34. At that point, receive packet detect circuit 68 will generate the CLEAR 2 signal which will be applied to the reset input R of FIFO memory 94 and clear the memory.

Whenever BIU 16 is not presently receiving a packet from transmission bus 12 (as indicated by the $\overline{\text{CARRIER}}$ signal), it must be ready to transmit in the event that token timer 36 runs out and generates $\overline{\text{INTR 2}}$. To this end, microprocessor 18 causes register 30 to generate DMA XMIT whenever the $\overline{\text{CARRIER}}$ signal is reset. The DMA XMIT signal is applied to transmit enable circuit 104 (FIG. 8) which generates the $\overline{\text{XMIT ENABLE}}$ and DMA EXMIT* signals which are applied to packet transmit circuit 88 (FIG. 3) and enable the transmission of an information or start-up packet by BIU 16.

The DMA XMIT signal is applied (FIG. 8) to AND gate 106, whose remaining input receives the $\overline{\text{CARRIER}}$ signal. The output of AND gate 106 will be set whenever DMA XMIT is set and $\overline{\text{CARRIER}}$ is reset (i.e., whenever a packet is not being received from the transmission bus 12). The resulting binary "1" appearing at the output of AND gate 106 is applied to the data input of flip-flop 108 and is clocked into the flip-flop by the $\overline{\text{INTR 2}}$ signal when token timer 36 times out. This sets the Q output of flip-flop 108, causing the generation of DMA XMIT* which initiates the transmit operation in the manner described below. This signal is also applied to the clock input of flip-flop 110, setting its Q output. This enables NAND gate 112 which generates the $\overline{\text{XMIT ENABLE}}$ signal in response to the next clock pulse CL1. This signal is applied to the packet transmit circuit 88 and enables the timing circuit 114 of transmit circuit 88 in a manner described below. This signal is also applied to the clear input of flip-flop 110 causing its Q output to be reset and thereby disabling $\overline{\text{XMIT ENABLE}}$.

Summarizing the foregoing, transmit enable circuit 104 generates DMA XMIT* and $\overline{\text{XMIT ENABLE}}$ the response to the generation of $\overline{\text{INTR 2}}$ whenever an information packet is not being received by BIU 16 from transmission bus 12. These signals enable the packet transmit circuit 88 and cause memory controller 84 to transfer a stored information packet from RAM memory 34 to packet transmit circuit 88 in the following manner.

Before token timer circuit 36 actually times out and causes the generation of DMA XMIT* and $\overline{\text{XMIT ENABLE}}$, microprocessor 18 knows that it will have to transmit either an information packet or a start-up packet if token timer 36 times out. In preparation of such transmission, microprocessor 18 generates an address indicating the address of the first bit of information to be transmitted (e.g., the first bit of the standard start-up packet stored in RAM memory 34) on address bus 22, generates information indicating the size of the packet to be transmitted (e.g., the number of bits of the start-up packet) on data bus 24, sets NB READ (indicating that information is to be read from RAM memory 34) and resets $\overline{\text{NB MEM EN}}$ (indicating that information is to be transferred from RAM memory 34 to packet transmit circuit 88). Memory controller 84 then waits for the REQ 2 signal generated by transmit packet circuit 88 to initiate a transfer of the packet identified by address and data buses 22 and 24. Transmit circuit 88 generates the request signal REQ 2 in response to the DMA XMIT* and $\overline{\text{XMIT ENABLE}}$ signals generated by transmit enable circuit 104. Referring to FIG. 3, the $\overline{\text{XMIT ENABLE}}$ signal is applied to the set input of flip-flop 116 setting its Q output, which is applied to AND gate 118. AND gate 118 also receives the input register full signal $\overline{\text{IRF}}$ generated by transmit FIFO memory 120. Before information is transferred from RAM memory 34 to FIFO memory 120, the input register of FIFO memory 120 is empty and the $\overline{\text{IRF}}$ signal is reset. As a result, AND gate 118 is enabled by the generation of DMA XMIT* which in turn enables AND gate 122, causing the generation of the request signal REQ 2. In response to the request signal REQ 2, memory controller 84 sets the M READ signal causing RAM memory 34 to place the first four bits of data to be transmitted onto data lines 128. Memory controller 84 transfers this information to FIFO Memory 120 by generating the WRITE NEXT pulse which is applied to the parallel load input of transmit FIFO memory 120. While any memory may be used, one commercially available FIFO memory is sold by Fairchild under the product designation 9403 FIFO buffer memory.

Once the first four bits of information have been read into the input register of FIFO memory 120, the input register full signal $\overline{\text{IRF}}$ will be set, disabling AND gate 118 and resetting the REQ 2 signal. The setting of the input register full signal $\overline{\text{IRF}}$ will also enable the transfer to stack input TTS of FIFO memory 120, causing the four bit word contained in the input register of memory 120 into the four bit word memory stack of memory 120. The removal of these four bits from the input register of FIFO memory 120 causes the input register full signal $\overline{\text{IRF}}$ to be reset thereby re-enabling AND gate 118 and causing the generation of another REQ 2 pulse. The receipt of this pulse informs memory controller 84 that FIFO memory 120 is ready to receive another four bit word. Accordingly, memory controller 84 transfers the next four bits of the information packet to be transmitted onto data lines 128. Memory controller 84 then generates another WRITE NEXT pulse which is applied to the parallel load input PL of FIFO memory 120 causing the four bit word to be read into the input register of FIFO memory 120. This process is repeated until the entire information packet to be transmitted has been read into FIFO memory 120.

At the beginning of the transmit operation, the output register empty signal $\overline{\text{ORE}}$ will be set. This signal enables the transfer from stack input TOS of FIFO memory 120 causing the first four bit word transferred into the memory stack to be transferred to the output register. The four bits of this word will then be applied in serial form (as in SIG A) to the Q output of FIFO memory 120 at a rate deterined by the XMIT CLOCK signal applied to the serial output enable input CPSO of FIFO memory 120.

The XMIT CLOCK pulses are generated at the base frequency of transmission bus 12 by AND gate 130. To this end, AND gate 130 receives the clock pulses CL1 on one of its inputs and the Q output of flip-flop 116 on its remaining input. At the initiation of a transmit operation, the $\overline{\text{XMIT ENABLE}}$ pulse sets flip-flop 116, enabling AND gate 130 and causing the generation of the XMIT CLOCK pulses. In addition to being applied to the serial output enable input CPSO of FIFO memory 120, the XMIT CLOCK pulses are applied to the CLOCK OUT input of modem 54 and to the clock input CL of CRC generator check circuit 132. CRC generator check circuit 122 initially passes the data bits applied to its data input D to its Q output as SIG B for transmission onto transmission bus 12. CRC generator check circuit 132 will continue to transmit these data bits in serial form until FIFO memory 120 no longer has further data bits to transfer. At this time, CRC generator check circuit 132 will add the standard cyclic redundancy check bits to the data packet in a known manner. Particularly, CRC generator check circuit 132 will add the cyclic redundancy check bits when its enable input E is set. Enable input E of CRC generator check circuit 132 will be set when the output register enable signal $\overline{ORE}$ is finally reset (i.e., when FIFO memory 120 no longer has data bits to transfer). While any CRC generates check circuit may be used, one commercially available unit is sold under the product designation 9401 CRC generator check circuit.

The output register empty signal $\overline{ORE}$ is also applied to the data input D of flip-flop 114. As long as FIFO memory 120 contains additional data bits to be transmitted, the output register empty signal $\overline{ORE}$ will be reset during each positive transition of the XMIT CLOCK pulses. As a result, the Q output of flip-flop 114 will remain set causing successive binary "0" signals to be shifted through shift register 115 at the XMIT CLOCK rate. When FIFO memory 120 no longer stores any additional data bits, the output register empty signal $\overline{ORE}$ will be set, causing the $\overline{Q}$ output of flip-flop 114 to be reset. This will cause a binary "1" to be placed into the first storage location of shift register 115. This binary "1" will be shifted through the successive Q outputs of shift register 115 at the XMIT CLOCK rate. After 16 XMIT CLOCK pulses have been generated, the binary "1" will be shifted to the Q 15 output of shift register 115, thereby resetting the Q output of flip-flop 116 and causing the generation of XMIT CLOCK pulses to stop. This completes a transmit operation.

Whenever BIU 16 wishes to gain priority access to bus 12, it must generate a tone signal and apply it to bus 12. The tone signal must remain on the bus for a sufficient length of time for the remaining BIUs 16 to detect the same. Whenever microprocessor 18 determines that it wishes to obtain priority access to bus 12, it will generate the $\overline{\text{TONE START}}$ command signal which is applied to the set input of flip-flop 134 of tone generator circuit 136 (see FIG. 6). This signal sets the Q output of flip-flop 134, thereby enabling resonator 138 to generate a high frequency tone signal of the proper frequency. This signal is applied to amplifier 140 which applies the amplified signal to bus 12. Tone generator circuit 136 continues to generate the tone until microprocessor 18 causes the generation of the $\overline{\text{TONE STOP}}$ control signal which is applied to the reset input R of flip-flop 134. This resets the Q output of flip-flop 134 and disables resonator 134 thereby removing the tone signal from bus 12.

Having described the various components of BIU 16 which relate to the bus accessing scheme of the present invention, the operation of BIU 16 will now be described with reference to the flow diagram of FIGS. 9–16. This flow diagram corresponds to the computer program stored in ROM 20.

Figure 9:
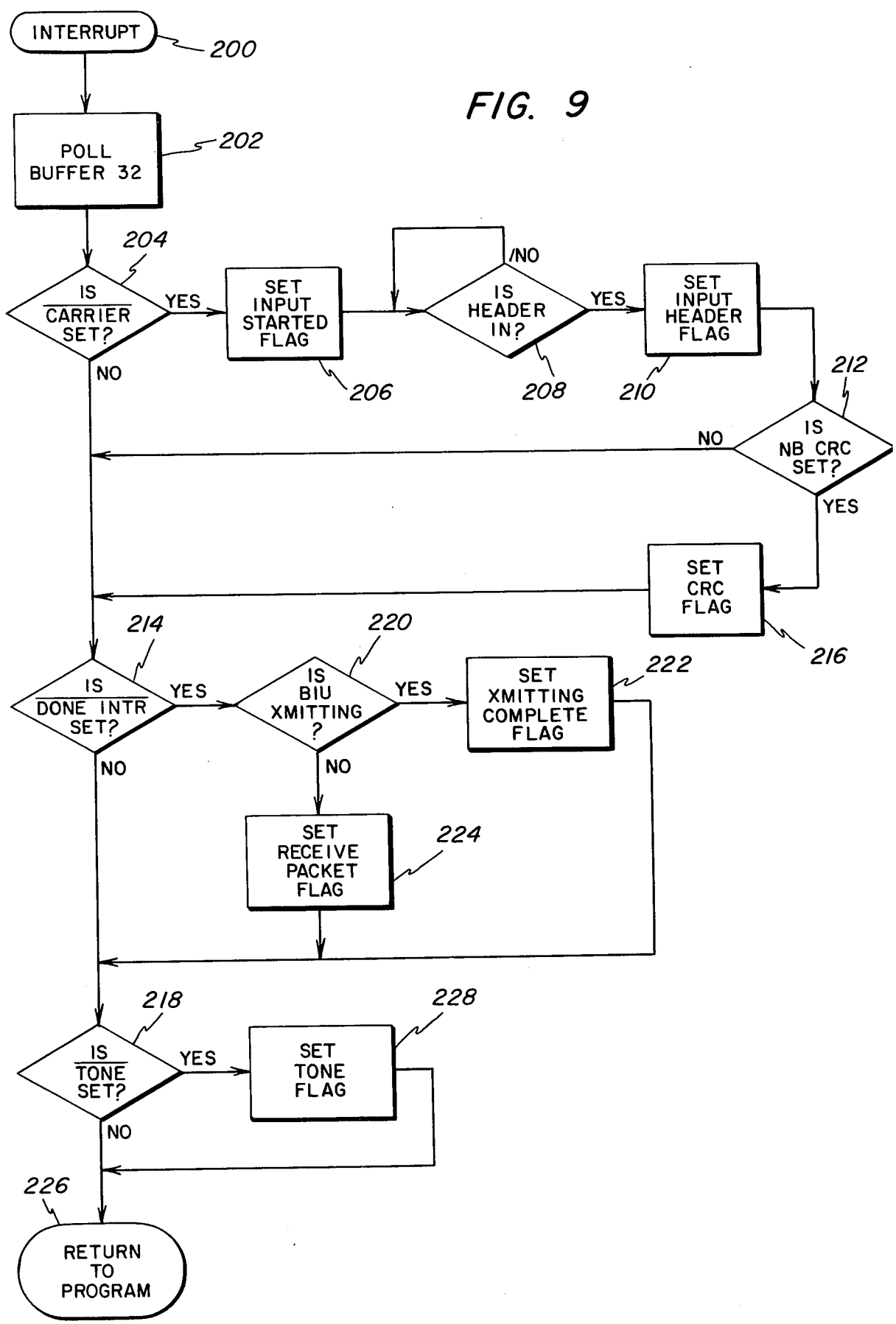

As noted above, whenever microprocessor 18 receives the interrupt signal $\overline{\text{INTR 1}}$, microprocessor 18 must enter an interrupt subroutine wherein it poles buffer 32 and sets appropriate flags in RAM memory 34 to indicate the occurrence of certain events. The interrupt subroutine which effectuates this process is illustrated in flow diagram form in FIG. 9. Whenever microprocessor 18 receives an interrupt signal on its INTR input, it completes the present program instruction it is executing and immediately jumps to the interrupt subroutine 200. As shown in FIG. 9, microprocessor 18 first poles buffer 32 (Step 202) by sebit in a location of RAM memory 34 corresponding to the input start-up flag. Thereafter, microprocessor 18 determines (Step 208) if the entire header of the received packet has been placed in the RAM memory 34. Microprocessor 18 determines this by examining a predetermined bit location in memory 34 which will be set to a predetermined logic level once the entire header is in. The microprocessor continues examining this bit location until it determines that the header has been placed in memory 34. At that point, microprocessor 18 sets the input header flag (Step 210) by setting the appropriate bit location in memory 34. Thereafter, microprocessor 18 examines the condition of the data line carrying the NB CRC signal (Step 212) to determine if it is set. If it is not, microprocessor 18 next examines (Step 214) the $\overline{\text{DONE INTR}}$ signal. If the NB CRC flag is set, microprocessor 18 sets (Step 216) an appropriate bit location in memory 34 corresponding to the CRC flag and then examines the data line on which the $\overline{\text{DONE INTR}}$ signal is located (Step 214). If the $\overline{\text{DONE INTR}}$ signal is not set, microprocessor 18 then examines (Step 218) the data line containing the $\overline{\text{TONE}}$ signal. If the $\overline{\text{DONE INTR}}$ signal is set, microprocessor 18 determines (Step 220) if its associated BIU 16 is in the transmitting mode. If it is, the microprocessor 18 sets (Step 222) the transmitting complete flag and the examines the condition of the data line containing the $\overline{\text{TONE}}$ signal (Step 218). If the BIU is not in the transmitting mode, microprocessor 18 sets (Step 224) the receive packet flag and then examines the $\overline{\text{TONE}}$ signal. If the $\overline{\text{TONE}}$ signal (Step 218) is not set, the interrupt routine is completed and microprocessor 18 picks up (Step 226) at the point in the program where it left off when it entered the interrupt subroutine. If the $\overline{\text{TONE}}$ signal is set, microprocessor 18 sets (Step 228) the tone flag bit location in memory 34. Thereafter, the interrupt subroutine has ended and the microprocessor returns (Step 226) to the point in the main program where it left off when it entered the interrupt routine.

Figure 10:
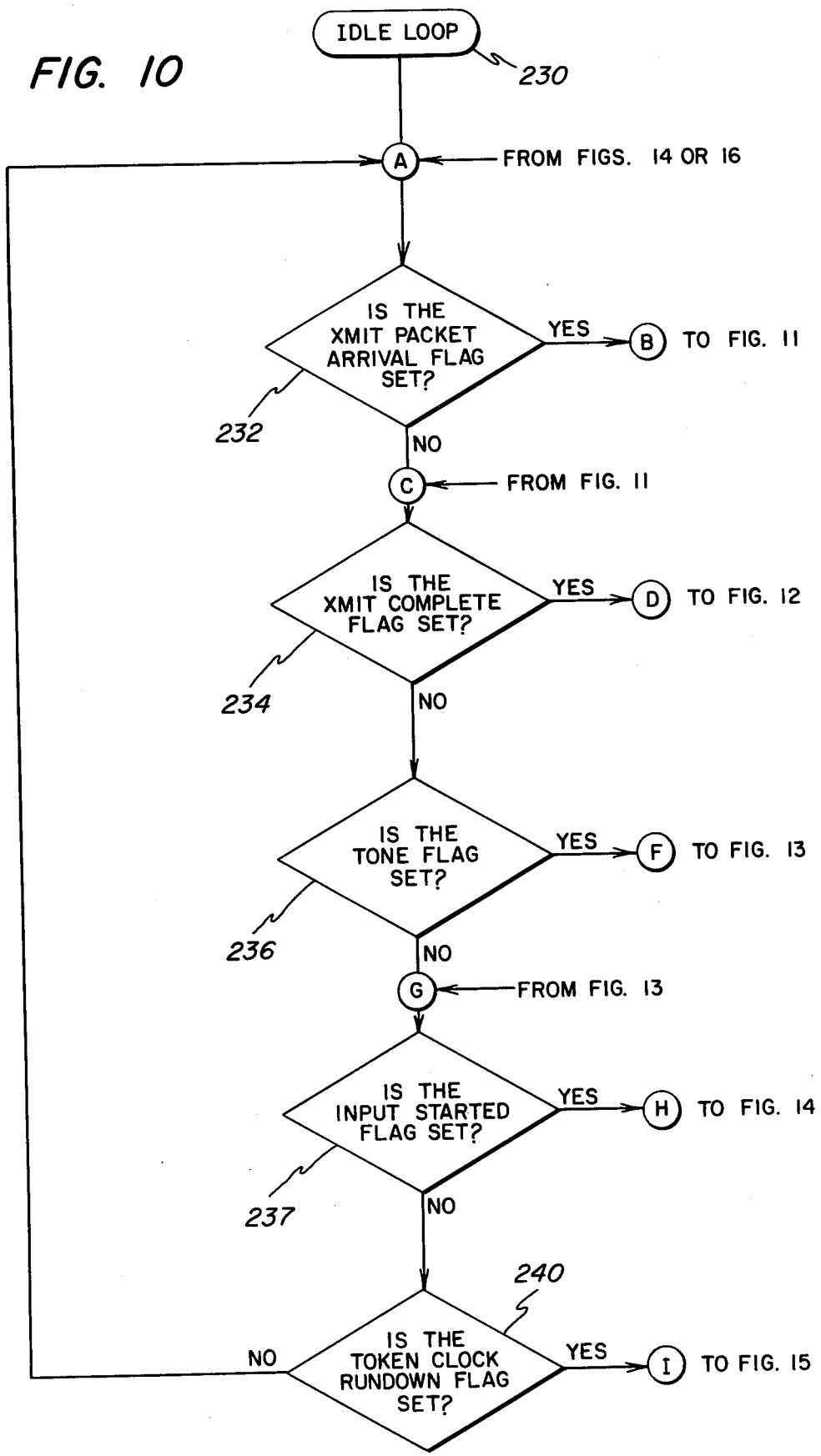
Figure 11:
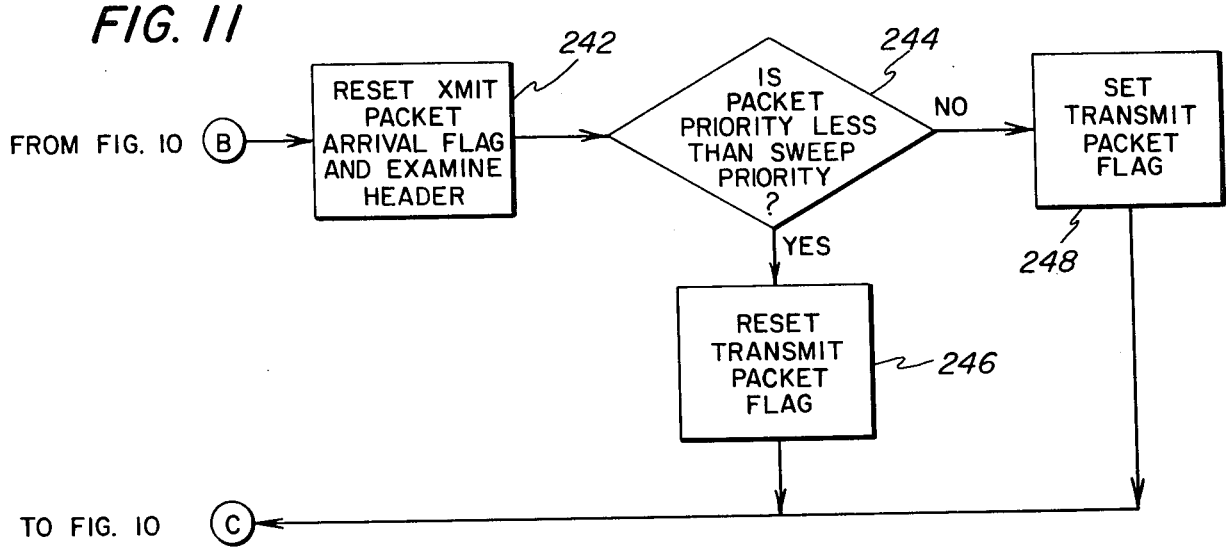
Figure 12:
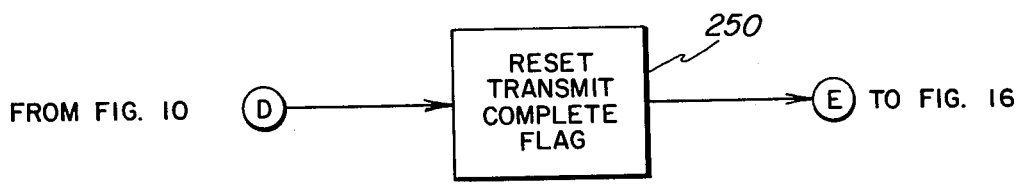

Whenever microprocessor 18 has completed any main program subroutine, it enters an idle loop (Step 230) illustrated in FIG. 10. The idle loop examines various flags located in memory 44 and determines which main program subroutine is to be entered. In the embodiment of the invention illustrated in FIG. 10, the first flag examined (Step 232) during the idle loop is the transmit packet arrival flag. The transmit arrival packet flag will be set whenever a new information packet has been transferred from the user terminal 14 to the RAM memory 34 whenever BIU 16 has an information packet stored in memory 34 for transmission. If the transmit packet arrival flag is set, microprocessor 18 enters the subroutine illustrated in FIG. 11 and described below. If the transmit packet arrival flag is not set, microprocessor 18 examines (Step 234) RAM memory 34 to determine if the transmit complete flag is set. If so, microprocessor 18 enters the subroutine illustrated in FIG. 12 and described below. If the transmit complete flag is not set, microprocessor 18 examines (Step 236) RAM memory 34 to determine if the tone flag is set. If so, microprocessor 18 enters the subroutine illustrated in FIG. 13. If this tone flag is not set, microprocessor 18 examines (Step 238) memory 34 to determine if the input start-up flag is set. If so, the microprocessor enters the subroutine illustrated in FIG. 14. If the input start-up flag is not set, microprocessor 18 examines (Step 240) memory 34 to determine if the token clock rundown flag is set. The token clock rundown flag will be set by microprocessor 18 whenever it receives the interrupt signal $\overline{\text{INTR 2}}$ signal on its NMI input. If the token clock rundown flag is set, microprocessor 18 enters the subroutine illustrated in FIG. 15. If the token clock rundown flag is not set, microprocessor 18 returns to point A in the idle loop and repeats its interrogation process.

Whenever microprocessor 18 determines that the transmit packet arrival flag is set, it must determine if the priority of the packet in memory 34 is sufficiently high to enable that packet to be transmitted on BIU 16. In order to make this determination, microprocessor 18 enters the subroutine illustrated in FIG. 11. As shown therein, microprocessor 18 first (Step 242) resets the transmit packet arrival flag and examines the header of the information packet to determine its priority. Microprocessor 18 then (Step 244) determines if the priority of the packet located in memory 34 is less than a sweep priority (indicating that the information packet cannot now be transmitted). If the priority of the information packet is less than the sweep priority, microprocessor 18 resets the transmit packet flag location in memory 34 (Step 246) and reenters the idle loop subroutine at point C. If the packet priority is equal to or greater than the sweep priority, microprocessor 18 sets the transmit packet flag (Step 248) and returns to the idle loop subroutine at point C. As will be shown below, the setting of the transmit packet flag will enable the transmission of the stored packet as soon as the token timer times out.

If, during the idle loop subroutine, microprocessor 18 determines that the transmit complete flag is set, it knows that the BIU 16 has completed a transmit operation and must now calculate the return sweep interval ΔT2. To this end, microprocessor 18 enters the subroutine illustrated in FIG. 12. As shown therein, microprocessor 18 resets the transmit complete flat (Step 250) and then jumps to the subroutine illustrated in FIG. 16. In this subroutine, microprocessor 18 first determines (Step 252) if the token is upstream or downstream by examining the source address and sweep direction stored in RAM memory 34 on comparing it with its own address. If the token is upstream, microprocessor 18 determines if the transmit disable flag is set (Step 254). If this flag is set, it indicates that another BIU has generated a tone signal, thereby requesting priority transmission on bus 12. As such, this BIU is not to respond to the first start-up packet it receives. To this end, microprocessor 18 resets (Step 256) the transmit disable flag, calculates the return sweep time interval ΔT2 (Step 258), and sets (Step 260) token timer 36 accordingly. If the transmit disable flag is not set, microprocessor 18 calculates the token time into ΔT1 (Step 262) and sets the token time accordingly (Step 260). At that point, microprocessor 18 returns to point A of the idle loop subroutine. If the token is downstream, microprocessor 18 calculates the return sweep time interval ΔT2 (Step 258), sets the token timer 36 accordingly (Step 260), and also returns to point A of the idle loop subroutine.

Figure 13:
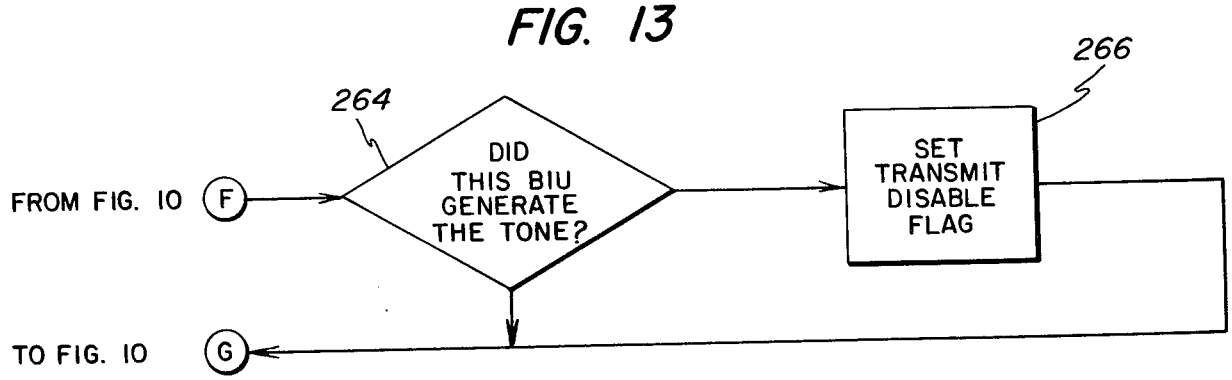

If, during the idle loop subroutine, microprocessor 18 determines that the tone flag is set, it enters the subroutine illustrated in FIG. 13. As shown therein, microprocessor 18 first determines (Step 264) if the BIU 16 is the BIU which generated the tone. If it is not, it sets the transmit diable flag (Step 266) to ensure that the BIU does not transmit a packet in response to the first start-up packet it receives. At that point, microprocessor 18 returns to point G of the idle loop subroutine. If the BIU did generate the tone, it immediately returns to point G of the idle loop subroutine.

Figure 14:
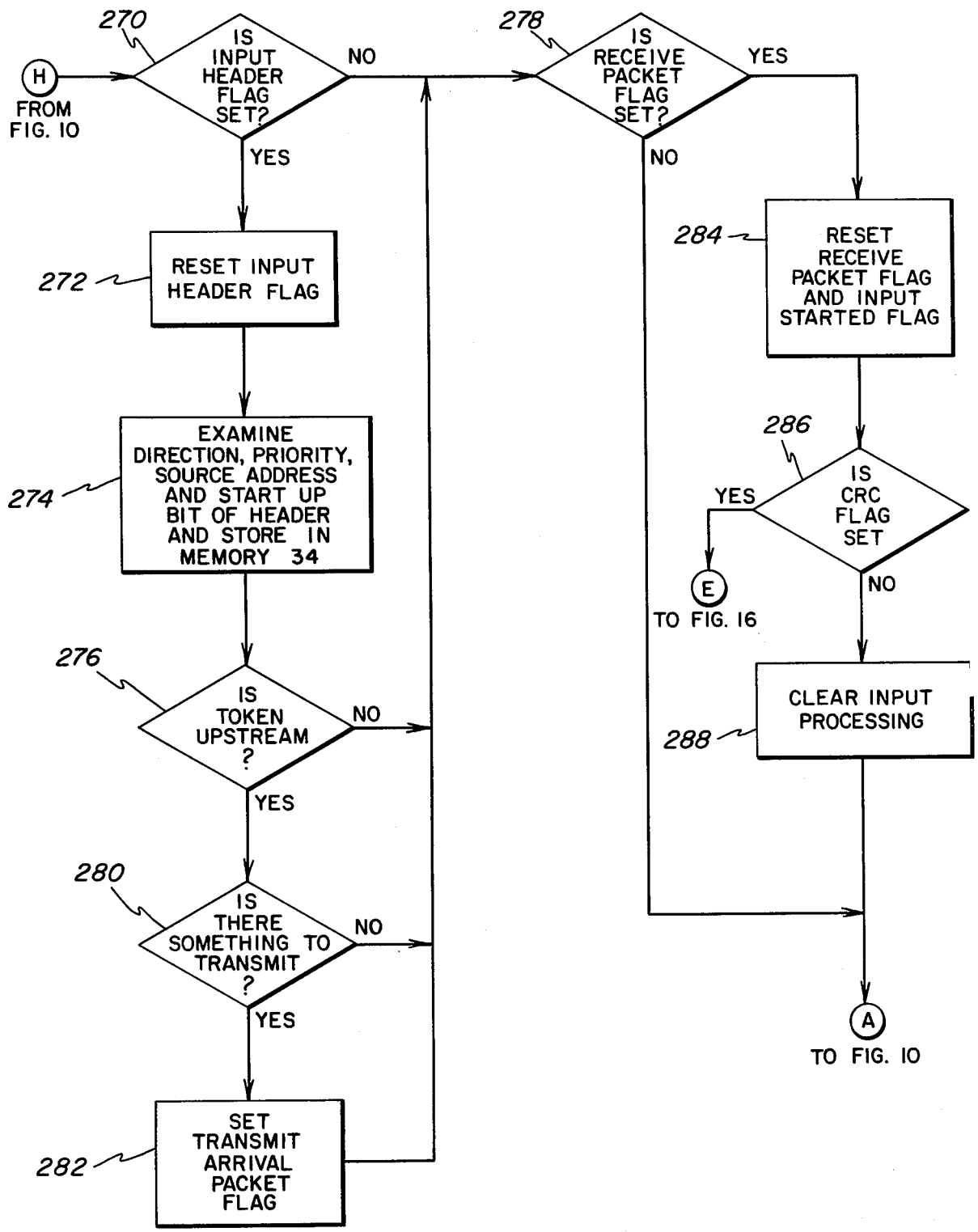

If, during the idle loop subroutine, microprocessor 18 determines that the input start-up flag is set (indicating that a new start-up or information packet is being received by BIU 16), microprocessor 18 enters the subroutine illustrated in FIG. 14. Microprocessor 18 first determines if the input header flag is set (Step 270). If so, it resets the input header flat (Step 272), then examines the direction, priority, source address, start-up bit and sweep direction of the header, and stores the information in appropriate locations in memory 34 (Step 274). Thereafter, microprocessor 18 determines if the token is upstream (Step 276). If the token is not upstream, microprocessor 18 determines (Step 278) if the receive packet flag is set. If the token is upstream, microprocessor 18 determines if there is an information packet in memory 34 to transmit (Step 280) and, if there is, it sets the transmit arrival packet flag (Step 282). If there is nothing to transmit, it next determines if the receive packet flag is set (Step 278). If the receive packet flag is not set, microprocessor 18 returns to point A of the idle loop. If the receive packet flag is set, microprocessor 18 resets the receive packet flag and the input start-up flag (Step 284). Thereafter, microprocessor 18 determines if the CRC flag is set (Step 286). If it is not, microprocessor 18 knows that the information received is invalid and clears (Step 288) all of the input processing (e.g., storage of priority, source address, etc.) and returns to point A of the subroutine. If the CRC flag is set, indicating that a valid packet has been received, microprocessor 18 enters point E of the subroutine illustrated in FIG. 16 so as to appropriately set the token timer 36 and reenter the idle loop subroutine.

Figure 15:
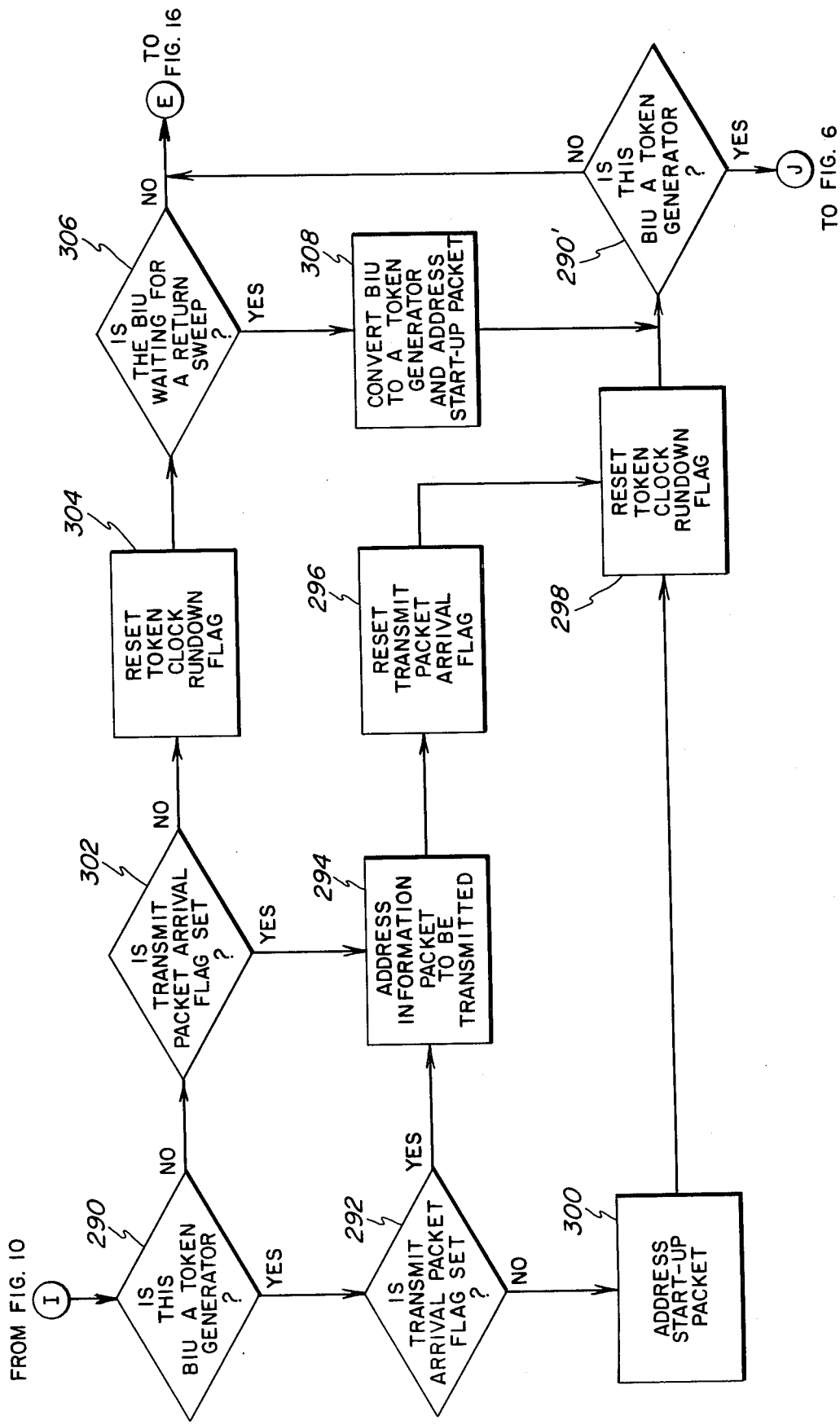

If, during the idle loop subroutine, microprocessor 18 determines that the token clock rundown flag is set, it enters the subroutine illustrated in FIG. 15. As shown therein, microprocessor 18 first determines if its BIU 16 is a token generator (Step 290). If it is a token generator, microprocessor 18 determines if the transmit arrival packet flag is set (Step 292) indicating that the BIU has an information packet to transmit. If the transmit arrival packet flag is set, microprocessor 18 addresses the information packet to be transmitted (Step 294), resets the transmit packet arrival flag (Step 296), resets the token clock rundown flag (Step 298) and returns to point J of the subroutine illustrated in FIG. 16. If the transmit packet arrival flag is not set (in Setp 292), microprocessor 18 addresses the start-up packet stored in memory 34 (Step 300), resets the token clock rundown flag (Step 298) and jumps to point J in the subroutine of FIG. 16.

If microprocessor 18 determines that its BIU is not a token generator, it next determines if the transmit packet arrival flag is set (Step 302). If it is, it addresses the information packet to be transmitted (Step 294), resets both the transmit packet arrival flag (Step 296) and the token clock rundown flag (Step 298) and (via the determination of Step 290) returns to point E of the subroutine of FIG. 16. If the transmit packet arrival flag is not set, microprocessor 18 resets the token clock rundown flag (Step 304) and determines if the BIU is waiting for a return sweep (Step 306). If it is, Step 308 converts the BIU to a token generator and addresses the startup packet stored in memory 34. Thereafter, the program returns to point J of the subroutine in FIG. 16. If the BIU is not waiting for a return sweep, microprocessor 18 returns to point E of the subroutine illustrated in FIG. 16.

In the embodiment of the invention illustrated above, it has been assumed that information packets should one of four priorities. It should be recognized, however, that greater or lesser numbers of priority levels can be employed. Additionally, the bus accessing method of the present invention may be used in connection with a non-priority system wherein the information packets have a single priority only. In the appended claims, the term "qualified information packet" shall refer to any information packet having a priority greater than or equal to the sweep priority in a priority based system and shall refer to any information packet ready for transmission in a non-priority system.

In the preferred embodiment described above, a high-frequency tone signal is transmitted by any BIU which wishes to gain high priority access to bus 12. While this process is advantageous (since it prevents the loss of any information packets presently on the bus), priority access to the bus may also be gained by placing an additional packet on the bus thereby causing a collision between the information packet presently on the bus and the packet placed on the bus by the BIU wishing to gain priority access. When such a system is used, each of the remaining BIUs will detect the collision (rather than the presence of a tone) and will proceed in the above-described manner to enable the BIU which caused the collision to obtain priority access to bus 12.

In the preferred embodiment of the present invention, successive token passing sweeps are initiated by left and right token generators. In accordance with the nomenclature used in the foregoing specification, a token is passed from the left token generator to the right token generator during a left sweep and from the right token generator to the left token generator during a right sweep. Accordingly, the token can be considered to flow from the left token generator towards the right token generator during a left sweep and from the right token generator towards the left token generator during a right sweep. In the appended claims, respective BIUs are referred to as being located upstream or downstream from each other. Using the foregoing nomenclature, all BIUs to the left of the BIU being considered will be upstream from the BIU being considered during a left sweep and will be downstream from the BIU being considered during a right sweep. Conversely, all BIUs to the right of the BIU being considered will be downstream from the BIU being considered during a left sweep and will be upstream from the BIU being considered during a left sweep.

The present invention may be embodied in other specific forms without departing from the spirit or essential attributes thereof and, accordingly, reference should be made to the appended claims, rather than to the foregoing specification as indicating the scope of the invention.

What is claimed is:

1. A bus communication system comprising:
   a data transmission bus;
   a plurality of bus interface units (BIUs) each connected to the transmission bus at spaced locations along said bus and each having a unique address indicative of its location along said bus, each of said BIUs being capable of transmitting packets of data onto said bus and receiving packets of data from said bus;
   first and second ones of said BIUs located at opposite ends of said transmission bus being token generators which initiate respective left and right token passing sweeps by placing one of a start-up packet and an information packet on said bus;
   each respective said BIU including: means for calculating a token time interval unique to said respective BIU each time said respective BIU receives one of the information and start-up packets transmitted by an upstream BIU, said token time interval being calculated as a function of the difference between the address of said respective BIU and the address of said upstream BIU;
   timing means for generating a token receipt signal at the end of the last token time interval calculated by said calculating means of said respective BIU; and
   means for transmitting an information packet on said transmission bus in response to said token receipt signal if said respective BIU has a qualified information packet to transmit.

2. The bus communication system of claim 1, wherein one of said token generators initiates a left sweep by transmitting one of said information packet and said start-up packet on said transmission bus in response to the generation of said token receipt signal by its timing means; and the other of said token generators initiates a right sweep by transmitting one of said information packet and said start-up packet on said transmission bus in response to the generation of said token receipt signal by its timing means.

3. The bus communication system of claim 2, wherein said transmitting means of each respective token generator transmits an information packet when the token generator of which it forms a part has a qualified information packet to transmit, and transmits a start-up packet when the token generator of which it forms a part does not have a qualified information packet to transmit.

4. The bus communication system of claim 2, wherein each of said information packets includes an information section containing information to be transmitted to a BIU other than the BIU which generated the information packet and a header section containing the addresses of both the BIUs which transmitted the information packet and of the BIU to which the information section is to be transmitted.

5. The bus communication system of claim 4, wherein each of said start-up packets includes a header section containing the address of the token generator which transmitted the start-up packet and does not include an information section.

6. The bus communication system of claim 2, wherein:
   (A) during each one of said token passing sweeps the calculating means of each respective BIU further calculates:
      (1) an initial return sweep time interval in response to the generation of said token receipt signal by said timing means of that respective BIU, said initial return sweep time interval representing the maximum length of time it should take for that respective BIU to receive one of said information packet and said start-up packet which is transmitted during the next successive token passing sweep by at least one BIU which is upstream from said respective BIU during said next successive token passing sweep if said bus communication system is operating properly; and (2) an updated return sweep time interval each time that respective BIU receives one of said information packet and said start-up packet transmitted by a downstream BIU during said one token passing sweep, said updated return sweep time interval representing the maximum length of time after receipt of said information packet transmitted by said downstream BIU that it should take for said respective BIU to receive one of said information packet and said start-up packet from a BIU which is upstream from said respective BIU during said next successive token passing sweep if said bus communication system is operating properly; and (B) said bus communication system further includes means for converting each respective BIU into a token generator:

(1) upon the expiration of said initial return sweep time interval if that respective BIU does not first receive one of said information packet and said start-up packet before the expiration of said initial return sweep time interval; and (2) upon the expiration of the last updated return sweep time interval calculated by said calculating means of that respective BIU if that respective BIU does not first receive one of said start-up packet and information packet which is transmitted during the next successive token passing sweep by a BIU which is upstream from that respective BIU during said next successive token passing sweep.

7. The bus communication system of claim 2, wherein each of said information packets has assigned to it one of N possible priority levels, N being an integer greater than 1; each of the token passing sweeps is assigned one of said priority levels at any given instant; and said transmitting means transmits said information packet only when said information packet has a priority level greater than or equal to the present priority of said token passing sweep.

8. The bus communication system of claim 7, wherein the priority level of each token passing sweep in initially determined by the priority level of that one of the start-up and information packets which initiated that sweep.

9. The bus communication system of claim 8, wherein the priority level of each sweep is thereafter determined by the last information packet placed on said bus during said sweep.

10. The bus communication system of claim 9, wherein the priority of each sweep is initially set at the lowest of said priority levels.

11. The bus communication system of claim 1, wherein each respective BIU further includes tone generating means for placing a tone signal on said transmission bus whenever said respective BIU wishes to obtain priority access to said bus, the frequency of said tone being such that said tone will not interfer with any one of said information packets and said start-up packet transmitted on said bus.

12. The bus communication system of claim 11, wherein each respective BIU includes means for disabling transmission of further information packets until that BIU which placed said tone signal on said transmission bus has transmitted an information packet on said transmission bus.

13. The bus communication system of claim 12, wherein each of said token generators includes means for causing one of said token generators to transmit a start-up packet in response to said tone signal.

14. The bus communication system of claim 13, wherein said disabling means includes means for ensuring that the BIU which placed said tone signal on said transmission bus is the first BIU to transmit an information packet in response to said start-up packet generated in response to said tone signal.

15. A bus communication system according to claim 14, wherein said tone generating means places said tone signal on said transmission bus only when its associated BIU wants to transmit a priority information packet and there is presently an information packet on said bus.

16. The bus communication system of claim 1, wherein each of said information packets has assigned to it one of N possible proprity levels, N being an integer greater than 1; each of said token passing sweeps is assigned one of said priority levels at any given instant; and said transmitting means transmits said information packet only when said information packet has a priority level greater than or equal to the present priority of said token passing sweep.

17. The process of transmitting information between a plurality of bus interface units (BIUs) connected serially along a data bus, said process comprising the steps of:

initiating a token passing sweep by injecting a first packet generated by one of said plurality of BIUs onto said bus, said packet having an identification of the location of the packet-injecting one of said BIUs along said transmission bus;

calculating at each respective remaining BIU a respective time delay related to the number of BIUs between said remaining BIU and said packet-injecting one of said BIUs;

conditioning a second of said plurality of BIUs to be capable of injecting a second packet of information generated by said second of said plurality of BIUs onto said bus after the elapse of said time delay calculated at said second BIU; and inhibiting the injection of said second packet of information by said second BIU if a packet is injected into said bus by any one of said BIUs which has a calculated time delay less than that of said second BIU.

18. A process for transmitting information between a plurality of bus interface units (BIUs) connected to a transmission bus at spaced locations along said bus, each BIU having a unique address indicative of its location along said bus, said process comprising the steps of:

initiating a left token passing sweep by causing the leftmost one of said BIUs to place one of a start-up packet and an information packet on said bus;

calculating at each of the respective remaining BIUs a respective token time interval unique to the respective BIU when the respective BIU receives that one of said information packet and said start-up packet transmitted by an upstream BIU during said left sweep, each respective token time interval being calculated as a function of the difference between the address of the respective BIU and the address of said upstream BIU; and causing each respective BIU to transmit an information packet on said transmission bus at the end of the last token time interval calculated at each respective BIU if that respective BIU has a qualified information packet to transmit.

19. The process of claim 18, further including the steps of: initiating a right token passing sweep by causing the rightmost one of said BIUs to place one of said start-up packet and information packet on said bus; calculating at each respective BIU located to the left of said rightmost one of said BIUs a respective token time interval unique to the respective BIU when the respective BIU receives that one of said information packet and said start-up packet transmitted by an upstream BIU during said right sweep, each respective token time interval being calculated as a function of the difference between the address of the respective BIU and the address of said upstream BIU; and causing each respective BIU to transmit an information packet on said transmission bus during said right sweep and at the end of the last token time interval calculated at each respective BIU if that respective BIU has a qualified information packet to transmit.

20. The process of claim 19, including the step of causing said leftmost and rightmost BIUs to initiate respective left and right token passing sweeps by placing an information packet on said bus when it has a qualified information packet to transmit, and by placing a start-up packet on said bus when it does not have a qualified information packet to transmit.

21. The process of claim 19, including the step of: configuring each of said information packets to include both an information section, containing information to be transmitted to a BIU other than the BIU which generated the information packet, and a header section, containing the address of both the BIU which transmitted the information packet and of the BIU to which the information section is to be transmitted.

22. The process of claim 21, including the step of: configuring each said start-up packet to include a header section, containing the address of the BIU which transmitted the start-up packet and to be devoid of an information section.

23. The process of claim 19, further including the step of: causing one of the BIUs to the left of the rightmost BIU to initiate a right token passing sweep by placing one of a start-up packet and an information packet on said bus when that one of said BIUs determines that either said transmission bus has been cut at a point to the right of said one BIU or that each of the BIUs located to the right of said one BIU is not operating properly.

24. The process of claim 23, including the step of: causing one of the BIUs to the right of the leftmost BIU to initiate a left token passing sweep by placing one of a start-up packet and an information packet on said bus when that one of said BIUs determines that either said transmission bus has been cut at a point to the left of said one BIU or that each of the BIUs located to the right of said one BIU is not operating properly.

25. The process of claim 19, further including the step of: placing a tone signal on said bus whenever one of said BIUs wishes to obtain priority access to said bus.

26. The process of claim 25, wherein said tone is placed on said bus by that BIU wishing to obtain priority access to said bus.

27. The process of claim 26, wherein each of the BIUs, except the BIU which placed said tone on said bus, disables transmission of further information packets until the BIU which placed said tone signal on said transmission bus has transmitted an information packet on said transmission bus.

28. The method of claim 26, wherein said tone signal is placed on said bus by the BIU wishing to obtain priority access only when there is presently an information packet on said bus.

29. The process of claim 19, further comprising the steps of: assigning to each of said information packets one of N possible priority levels, N being an integer greater than 1; assigning one of said priority levels to each of said token passing sweeps at any given instant; and allowing each of said BIUs to transmit an information packet only when said information packet has a priority level greater than or equal to the present priority of said token passing sweep.

30. The process of claim 29, including the step of: initially determining the priority level of each token passing sweep by the priority level of that one of said start-up packet and said information packet which initiated that sweep.

31. The process of claim 30, further including the step of: thereafter determining the priority level of each said sweep by the last information packet placed on said bus during said sweep.

32. The process of claim 31, further including the step of: initially setting the priority of each said sweep at the lowest of said priority levels.

33. The process of claim 29, further including the steps of: assigning at least one data port of at least one BIU to receive a dedicated data input; causing the associated BIU to form each sequential set of a predetermined number of bytes of dedicated input port data into a minipacket, where the number of data bytes in a set is less than the number of data bytes in other information packets; and causing the BIU to operate in a circuit switched time-division multiplexed manner.

34. The process of claim 33, wherein the data at the dedicated input port is encoded voice data.

* * * * *